United States Patent
Burkhart et al.

(10) Patent No.: US 11,635,181 B2
(45) Date of Patent: Apr. 25, 2023

(54) MOUNTING BRACKET SYSTEM FOR LIGHT FIXTURES

(71) Applicant: LUXX LIGHTING, INC., Mira Loma, CA (US)

(72) Inventors: Brandon Burkhart, Stuart, FL (US); Thomas O'Connor, Pasadena, CA (US)

(73) Assignee: HGCI, Inc., Las Vegas, NV (US)

( * ) Notice: Subject to any disclaimer, the term of this patent is extended or adjusted under 35 U.S.C. 154(b) by 0 days.

(21) Appl. No.: 17/245,560

(22) Filed: Apr. 30, 2021

(65) Prior Publication Data

US 2022/0349537 A1 Nov. 3, 2022

(51) Int. Cl.
*F21S 8/04* (2006.01)
*F21V 21/03* (2006.01)
*F21Y 115/10* (2016.01)
*F21Y 103/10* (2016.01)

(52) U.S. Cl.
CPC .............. *F21S 8/043* (2013.01); *F21V 21/03* (2013.01); *F21Y 2103/10* (2016.08); *F21Y 2115/10* (2016.08)

(58) Field of Classification Search
CPC ...................................................... F21V 21/03
See application file for complete search history.

(56) References Cited

U.S. PATENT DOCUMENTS

| | | |
|---|---|---|
| 2,357,057 A | 8/1944 | Ray |
| 3,565,385 A | 2/1971 | Zurawski |
| 4,363,082 A | 12/1982 | Roland |
| 5,624,202 A * | 4/1997 | Grierson ............... F21V 21/005 403/380 |
| 9,124,030 B1 | 9/2015 | Chiu et al. |
| 9,541,266 B2 | 1/2017 | Bolscher |
| 9,895,457 B2 | 2/2018 | Elku et al. |
| 10,403,997 B2 | 9/2019 | Birkholz et al. |
| 10,465,896 B2 | 11/2019 | Van Winkle |
| 10,731,803 B2 | 8/2020 | Van Winkle |

(Continued)

FOREIGN PATENT DOCUMENTS

| | | |
|---|---|---|
| CN | 202134729 U | 2/2012 |
| CN | 202629625 U | 12/2012 |

(Continued)

OTHER PUBLICATIONS

"PCT/US2022/72000 International Search Report and Written Opinion", dated Jul. 20, 2022, 13 Pages.

*Primary Examiner* — Leah Simone Macchiarolo

(57) ABSTRACT

A mounting bracket for a lighting system includes a body portion having an elongated shape and defining a top side and a bottom side opposing the top side. The body portion defines, within the bottom side, a plurality of channels spaced apart along an axial direction of the elongated shape, wherein one or more channels of the plurality of channels is configured to receive a mounting portion of a linear light fixture of the lighting system. The body portion further defines, within the top side, a plurality of holes spaced apart along the axial direction corresponding to the plurality of channels, wherein one or more holes of the plurality of holes extends into a corresponding channel of the plurality of channels and is configured to receive a fastening structure therethrough.

20 Claims, 17 Drawing Sheets

(56) References Cited

U.S. PATENT DOCUMENTS

| | | | | |
|---|---|---|---|---|
| 2014/0238717 | A1* | 8/2014 | Korcz | H02G 3/04 |
| | | | | 248/343 |
| 2016/0003453 | A1* | 1/2016 | Klase | F21S 4/28 |
| | | | | 362/220 |
| 2017/0002990 | A1 | 1/2017 | O'Brien et al. | |
| 2019/0088241 | A1 | 3/2019 | Czech et al. | |
| 2019/0277466 | A1* | 9/2019 | Peck | F21S 8/043 |
| 2020/0173639 | A1* | 6/2020 | Martin | F21V 21/048 |

FOREIGN PATENT DOCUMENTS

| | | |
|---|---|---|
| CN | 204328635 U | 5/2015 |
| CN | 205790639 U | 12/2016 |
| CN | 104882726 B | 6/2017 |
| CN | 207490205 U | 6/2018 |
| CN | 105932468 B | 12/2018 |
| CN | 109004439 A | 12/2018 |
| CN | 208315776 U | 1/2019 |
| CN | 208779188 U | 4/2019 |
| CN | 110061394 A | 7/2019 |
| CN | 209054376 U | 7/2019 |
| CN | 209856841 U | 12/2019 |
| CN | 110932031 A | 3/2020 |
| CN | 106678582 B | 6/2020 |
| CN | 211126327 U | 7/2020 |
| CN | 211320451 U | 8/2020 |

* cited by examiner

MOUNTING BRACKET SYSTEM FOR LIGHT FIXTURES

FIELD

The described examples relate generally to structures and techniques for structurally supporting light fixtures, such as a linear light fixtures.

BACKGROUND

Light fixtures may be used to provide energy to biological organisms and systems to promote growth. For example, light fixtures may provide thermal energy, ultraviolet radiation, and the like to plants that are grown in an indoor environment in order to encourage photosynthesis and other processes that contribute to plant health. Often individual light fixtures emit a single spread of light to a collection of plants held in trays or bins below the fixture. As the light dissipates as the inverse of the square of the distance from the fixture, multiple fixtures may be spaced apart and above the plants in order to provide adequate illumination. Unevenly spaced light fixtures can produce zones of concentrated energy and/or zones with suboptimal energy at the plants held below the fixtures. Light fixtures can be cumbersome, bulky, and heavy, which can hinder the ability to secure the light fixtures above the collection of plants in a desired arrangement. As such, there is a need for systems and techniques to facilitate light fixture mounting at a desired set spacing for indoor grown plants.

The information included in this Background section of the specification is included for technical reference purposes only and is not to be regarded subject matter by which the scope of the invention as defined in the claims is to be bound.

SUMMARY

In one example, a mounting bracket for a lighting system is disclosed. The mounting bracket includes a body portion having an elongated shape. The mounting bracket defines a top side and a bottom side opposing the top side. The body portion defines, within the bottom side, a plurality of channels spaced apart along an axial direction of the elongated shape. One or more channels of the plurality of channels is configured to receive a mounting portion of a linear light fixture of the lighting system. The body portion further defines, within the top side, a plurality of holes spaced apart along the axial direction corresponding to the plurality of channels. The one or more holes of the plurality of holes extends into a corresponding channel of the plurality of channels and is configured to receive a fastening structure therethrough.

In another example, a mounting bracket system is disclosed. The mounting bracket system includes any of the example mounting bracket described herein. The mounting bracket system further includes a linear light fixture having a mounting portion received in one channel of the plurality of channels of the mounting bracket. The mounting bracket system further includes a fastening structure received through a hole of plurality of holes corresponding to the one channel. The fastening structure secures the mounting portion to the mounting bracket.

In another example, a mounting bracket system is disclosed. The mounting bracket system includes a first linear light fixture having an elongated first mounting portion. The mounting bracket system further includes a second linear light fixture having an elongated second mounting portion. The mounting bracket system further includes a first mounting bracket having an elongated first shape and defining a plurality of first channels configured to receive the elongated first and second mounting portions. The mounting bracket system further includes a second mounting bracket having an elongated second shape and defining a plurality of second channels configured to receive the elongated first and second mounting portions. The plurality of first channels and the plurality of second channels are configured to define a spacing between the first and second linear light fixtures.

In another example, a method of supporting a collection of linear light fixtures is disclosed. The method includes connecting an elongated first mounting portion of a first linear light fixture with a one channel of a plurality of first channels of an elongated first mounting bracket. The method further includes connecting the elongated first mounting portion with one channel of a plurality of second channels of an elongated second mounting bracket. The method further includes connecting an elongated second mounting portion of a second linear light fixture with another channel of the plurality of first channels. The method further includes connecting the elongated second mounting portion with another channel of the plurality of second channels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1:
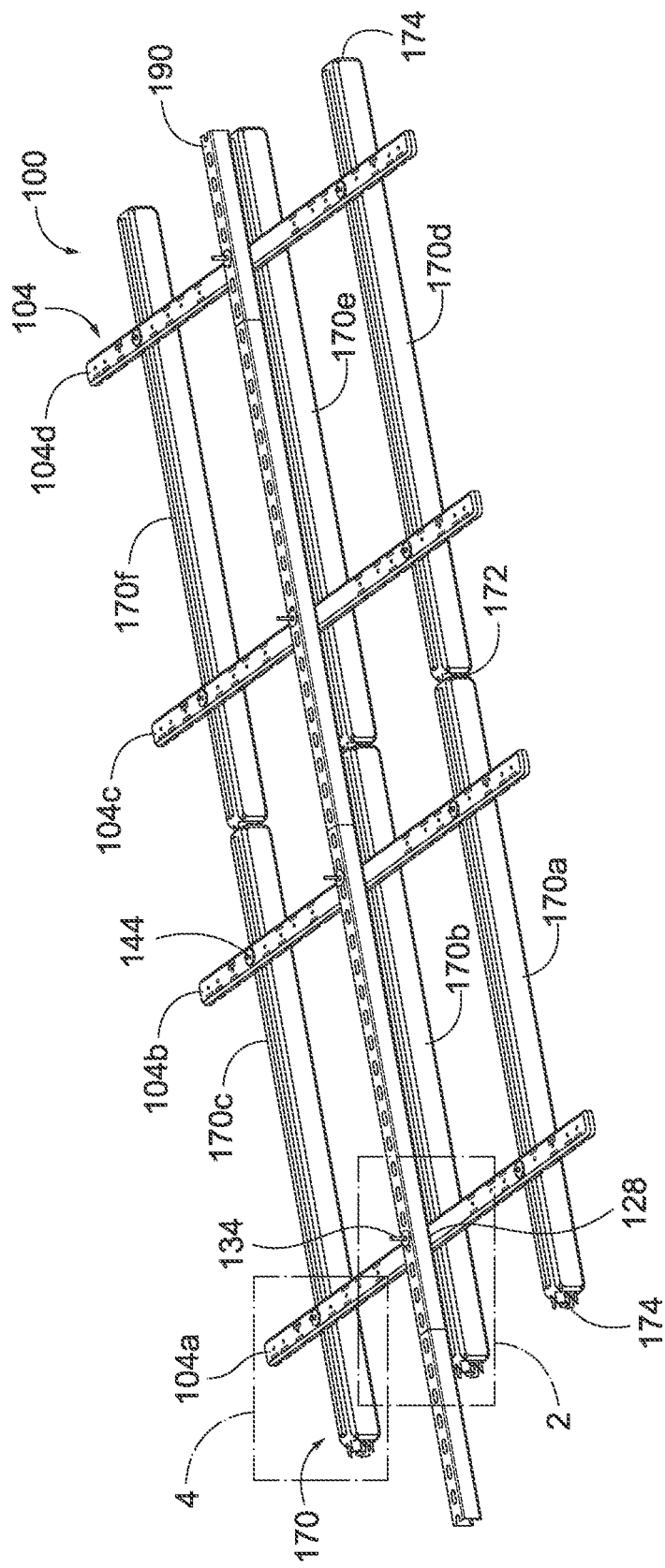

FIG. 1 depicts a mounting bracket system supporting a collection of light fixtures.

Figure 2:
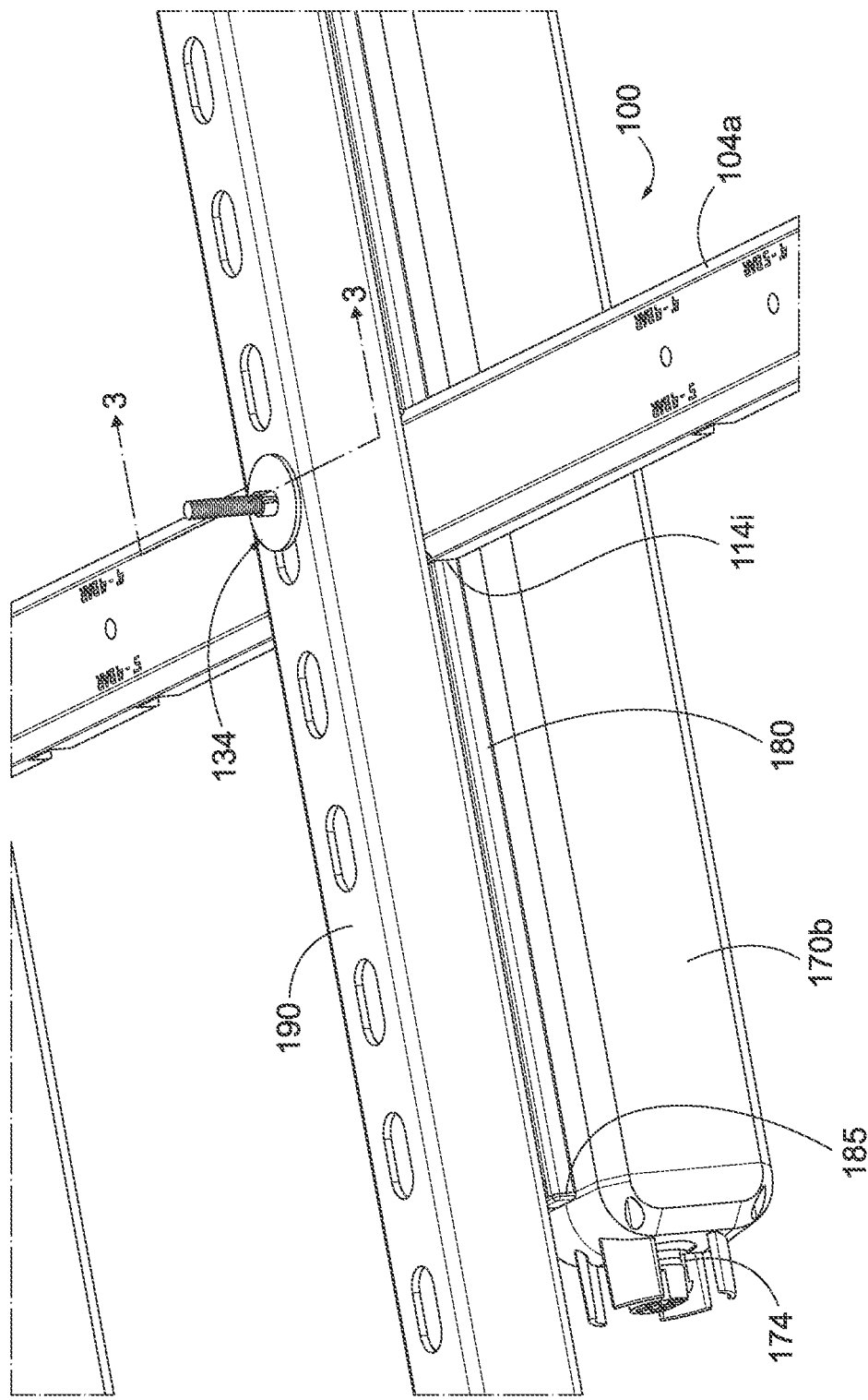

FIG. 2 depicts detail 2-2 of the mounting bracket system of FIG. 1.

Figure 3:
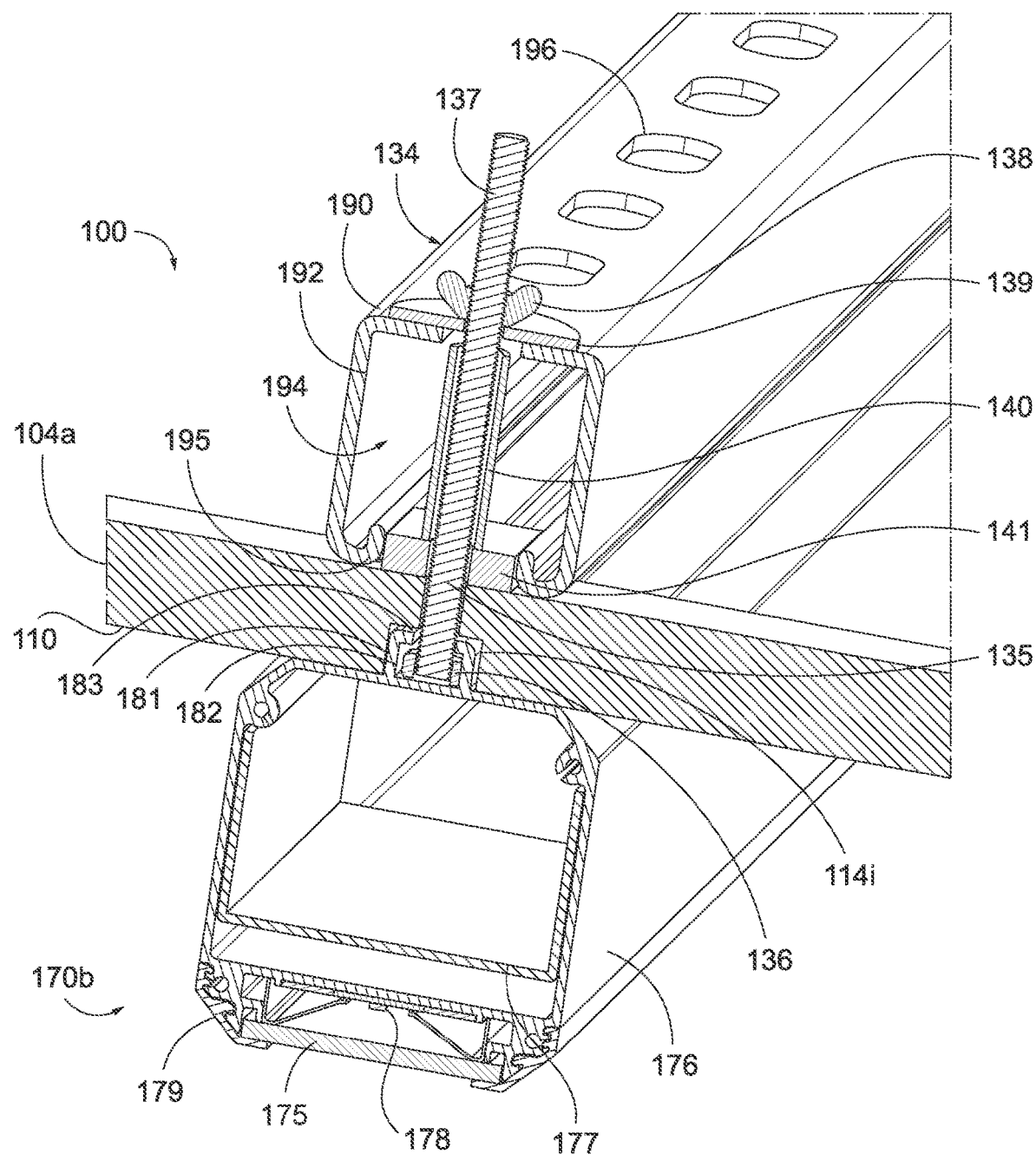

FIG. 3 depicts a cross-sectional view of the mounting bracket system of FIG. 2, taken along line 3-3 of FIG. 2.

Figure 4:
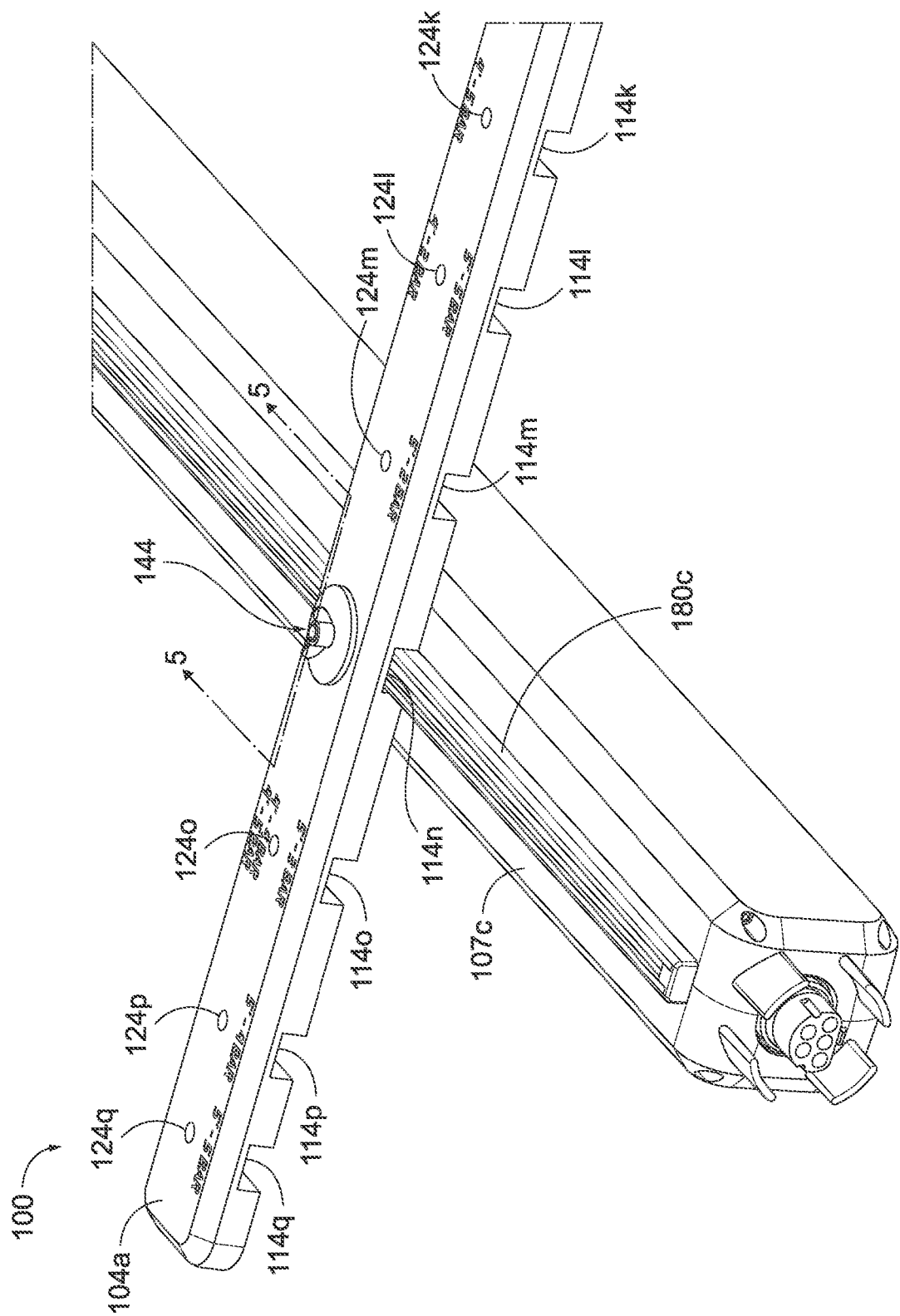

FIG. 4 depicts detail 4-4 of the mounting bracket system of FIG. 1.

Figure 5:
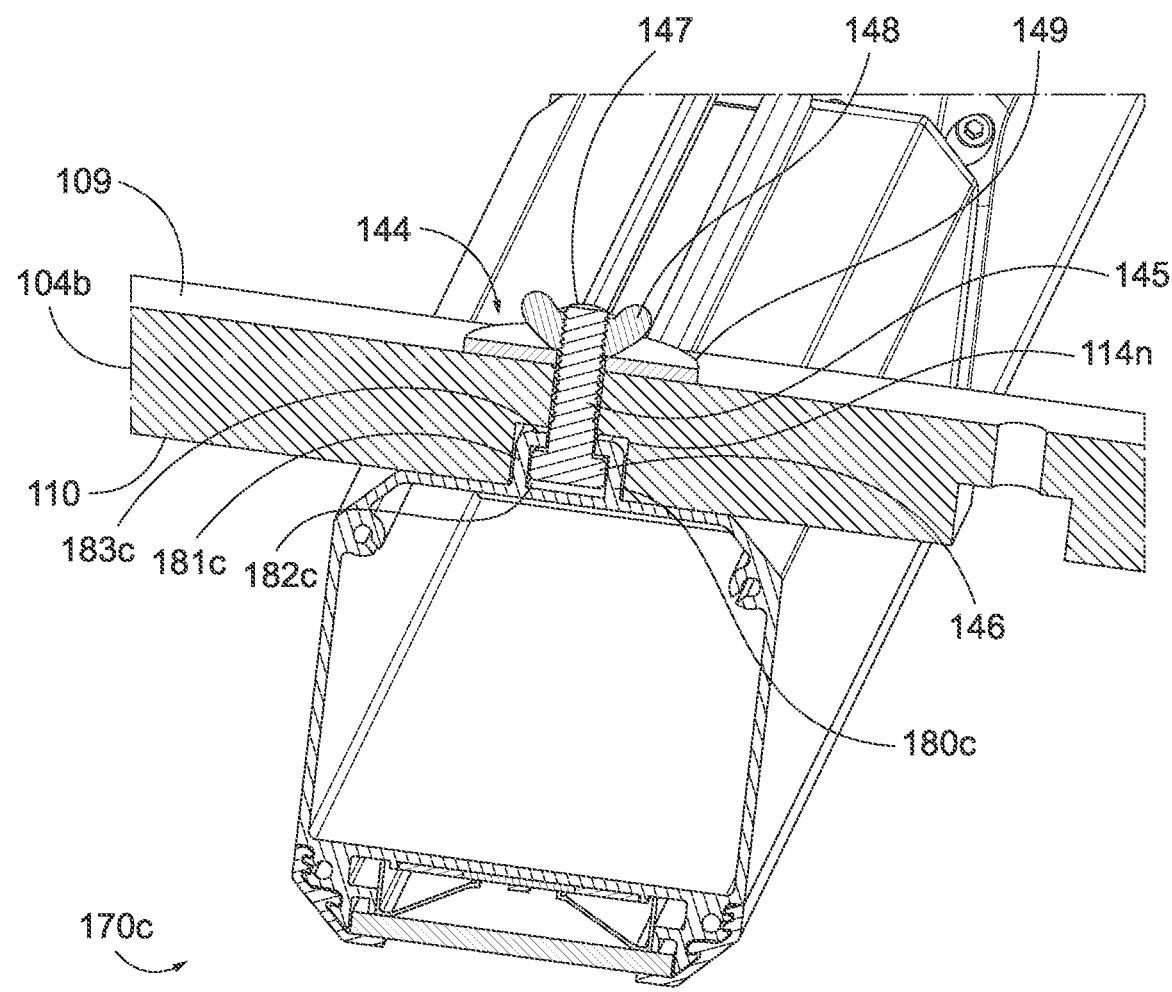

FIG. 5 depicts a cross-sectional view of the mounting bracket system of FIG. 4, taken along line 5-5 of FIG. 4.

Figure 6:
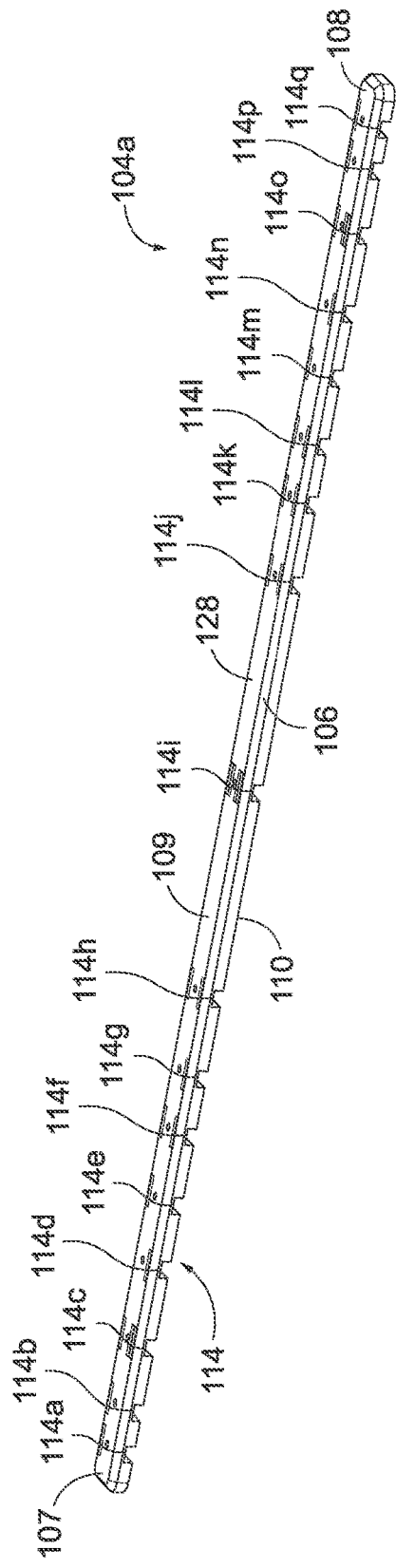

FIG. 6 depicts an isometric view of a mounting bracket of the mounting bracket system of FIG. 1.

Figure 7:
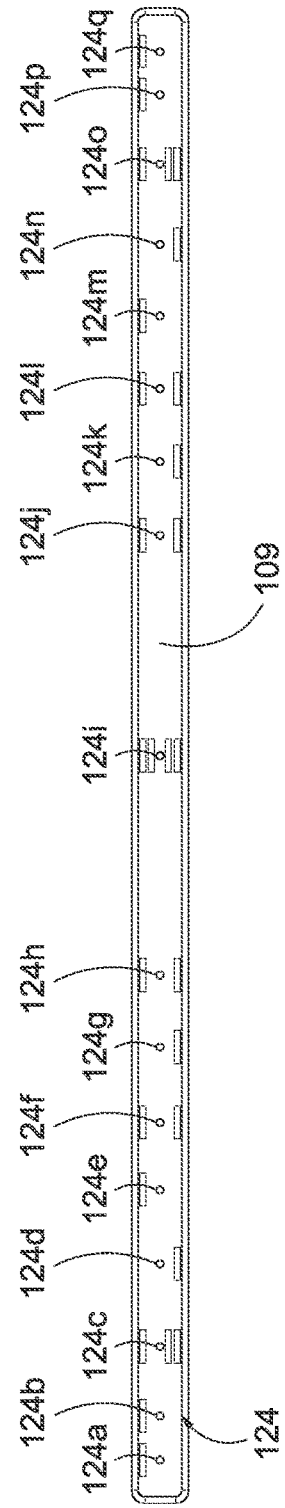

FIG. 7 depicts a top view of the mounting bracket of FIG. 6.

Figure 8:
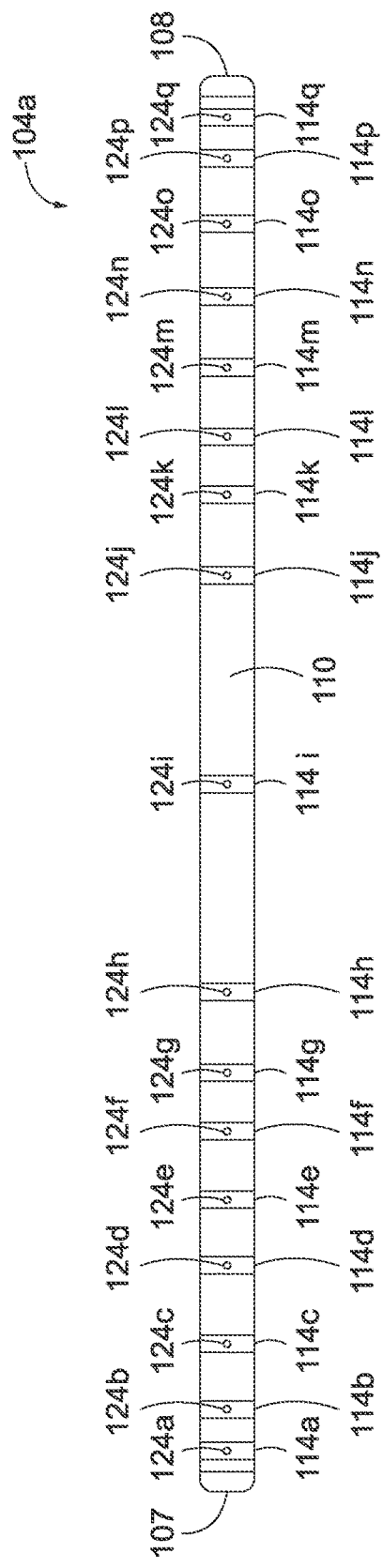

FIG. 8 depicts a bottom view of the mounting bracket of FIG. 6.

Figure 9:
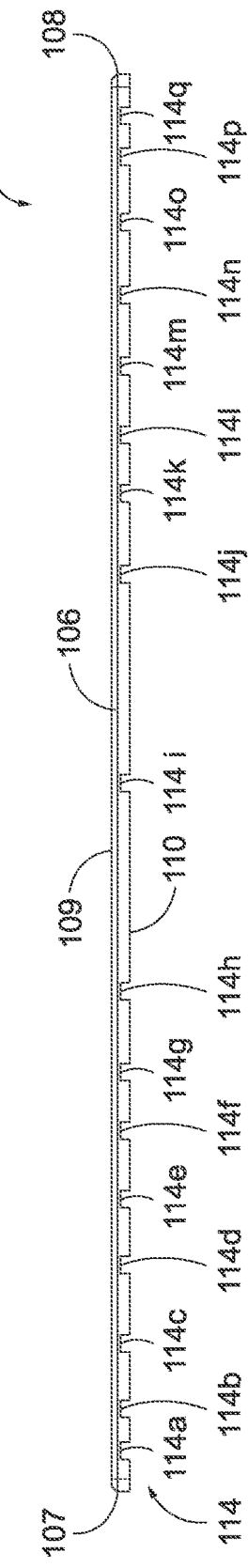

FIG. 9 depicts a side view of the mounting bracket of FIG. 6.

Figure 10:
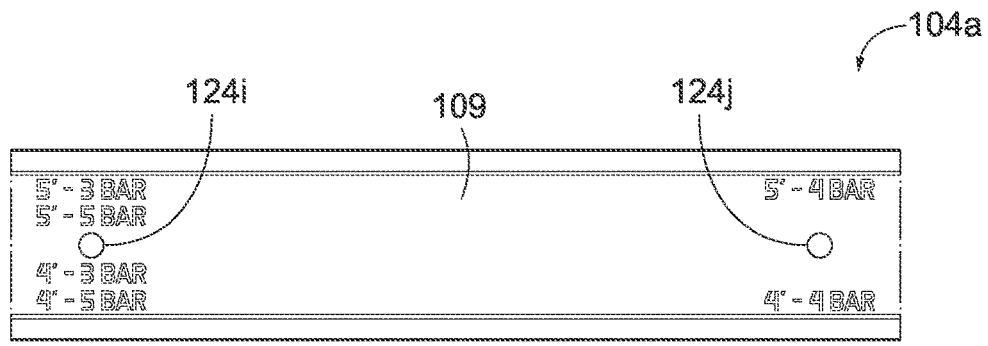

FIG. 10 depicts a top view of a first portion of the mounting bracket of FIG. 6.

Figure 11:
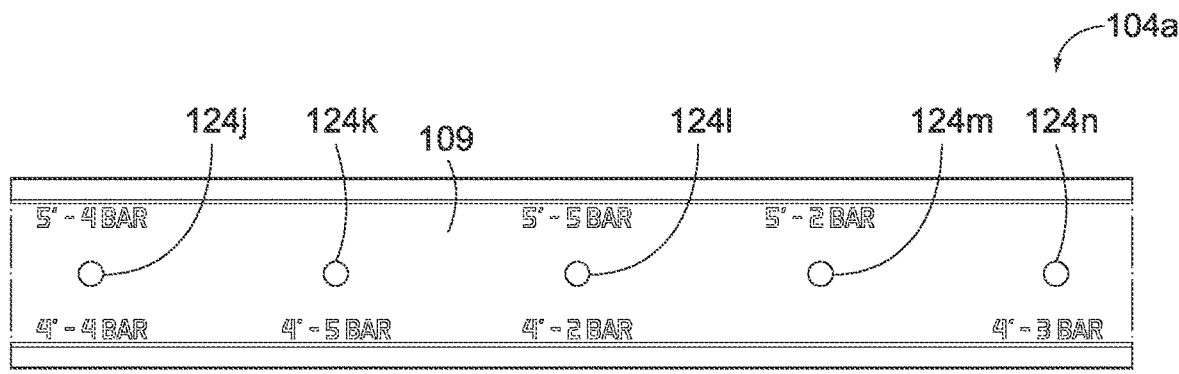

FIG. 11 depicts a top view of a second portion of the mounting bracket of FIG. 6.

Figure 12:
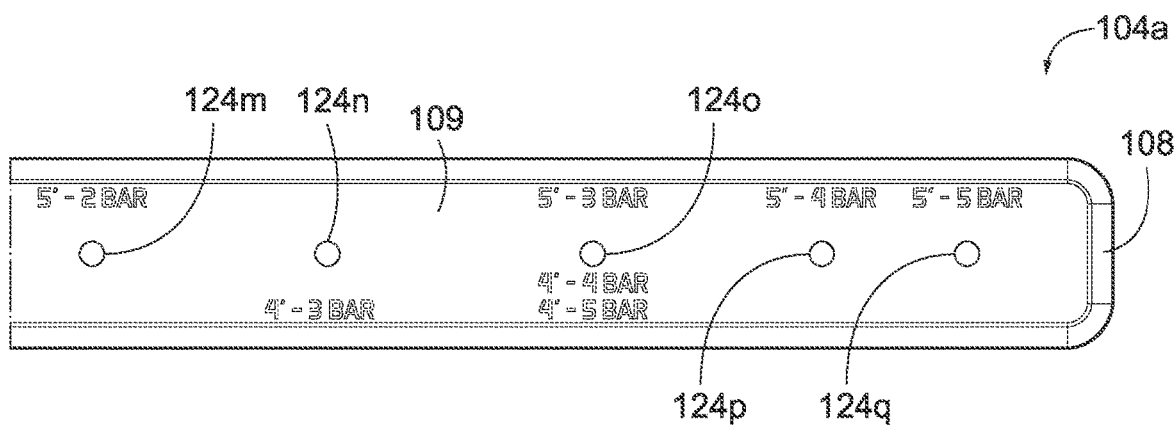

FIG. 12 depicts a top view of a third portion of the mounting bracket of FIG. 6.

Figure 13:
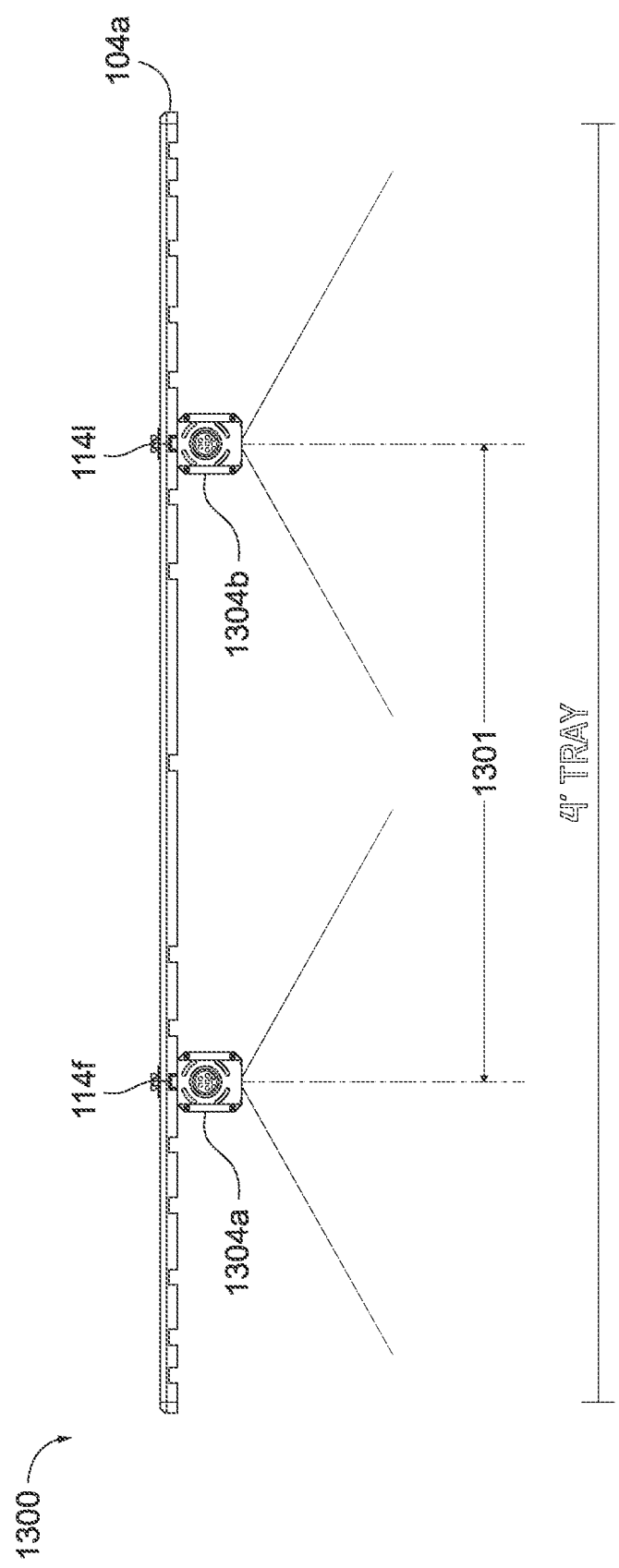

FIG. 13 depicts the mounting bracket system of FIG. 1 supporting a collection of light fixtures in an example growing environment.

Figure 14:
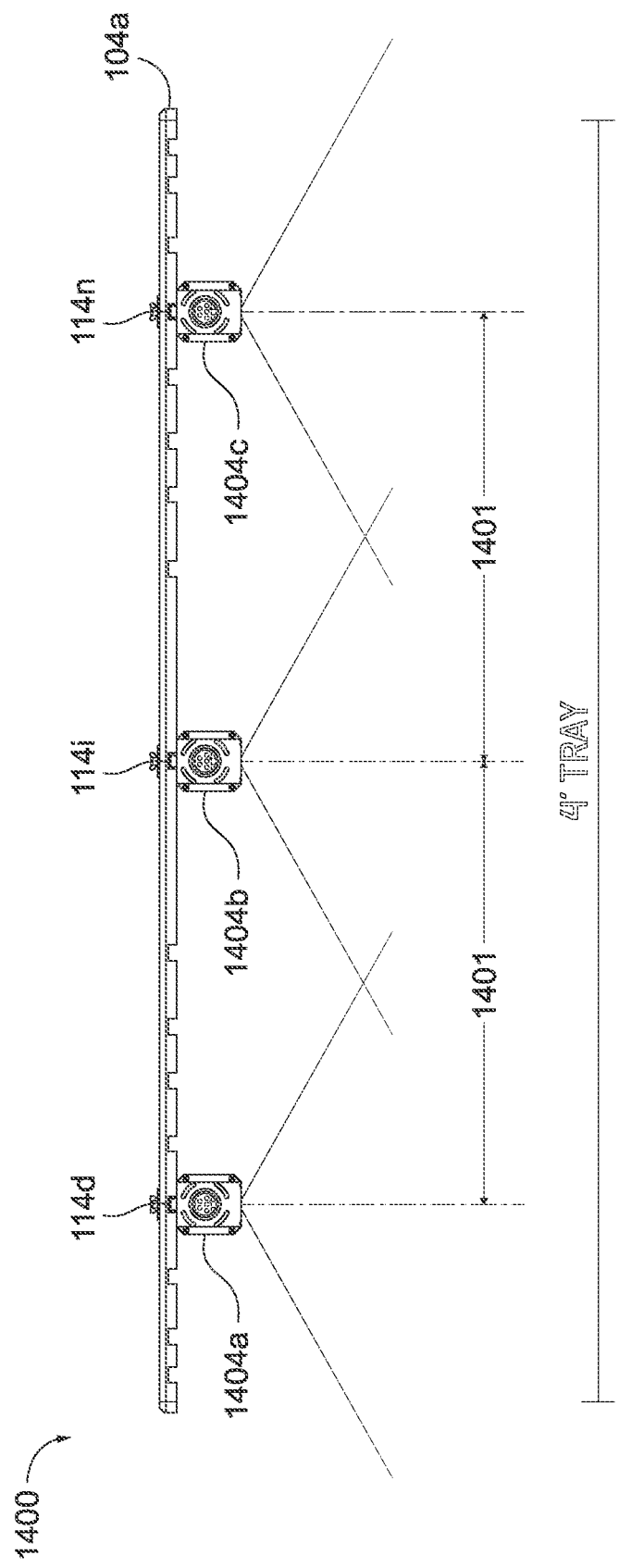

FIG. 14 depicts the mounting bracket system of FIG. 1 supporting a collection of light fixtures in another example growing environment.

Figure 15:
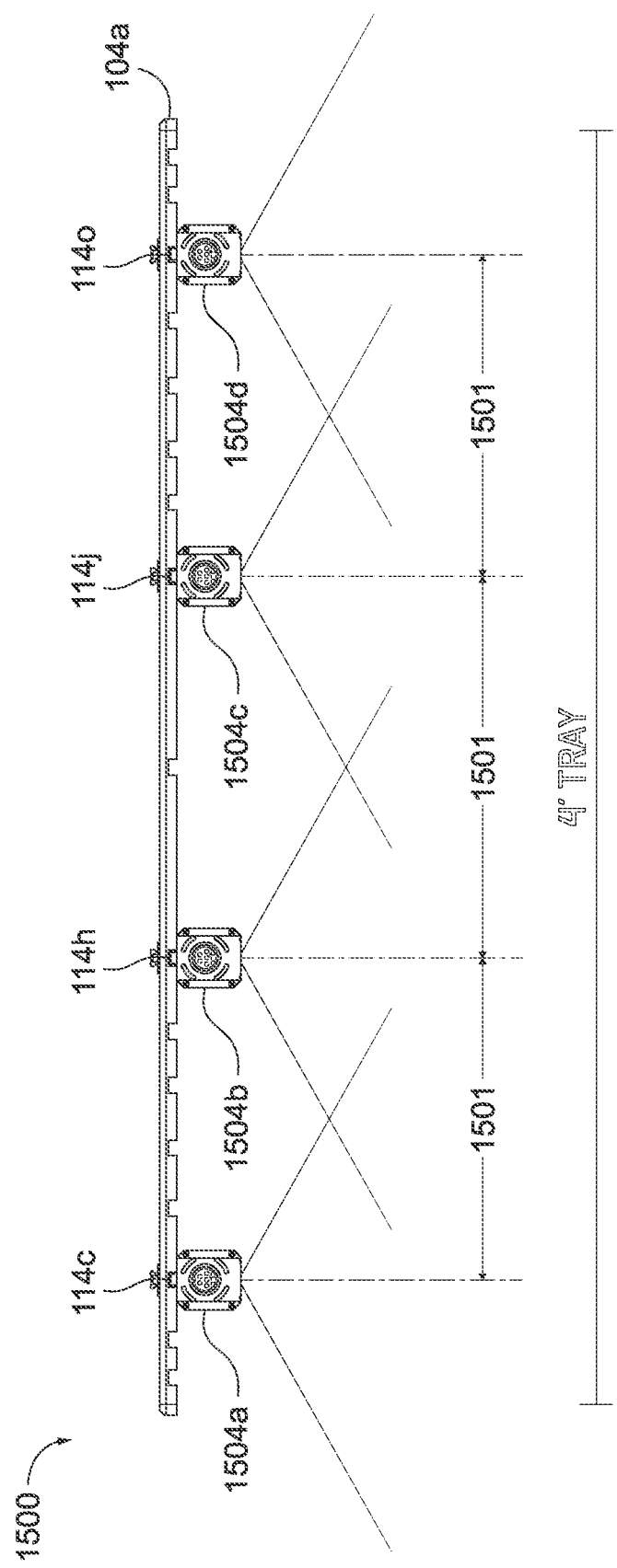

FIG. 15 depicts the mounting bracket system of FIG. 1 supporting a collection of light fixtures in another example growing environment.

Figure 16:
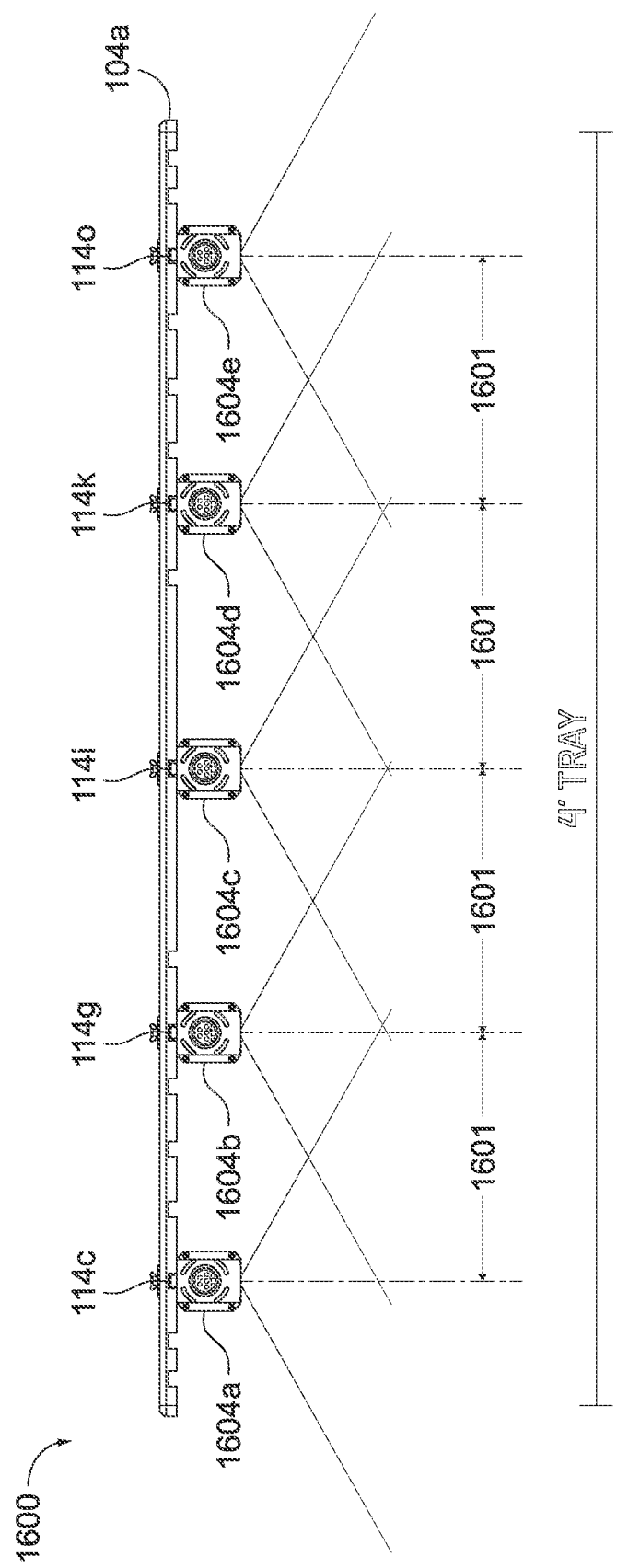

FIG. 16 depicts the mounting bracket system of FIG. 1 supporting a collection of light fixtures in another example growing environment.

Figure 17:
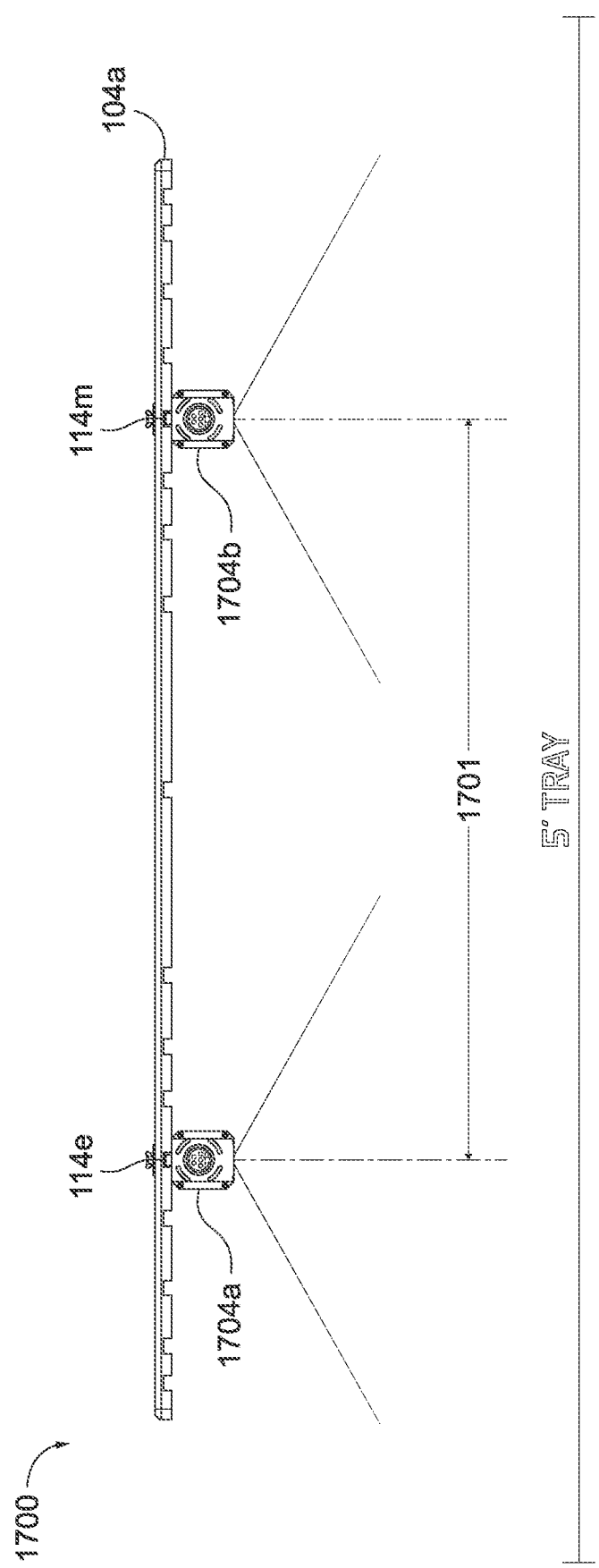

FIG. 17 depicts the mounting bracket system of FIG. 1 supporting a collection of light fixtures in another example growing environment.

Figure 18:
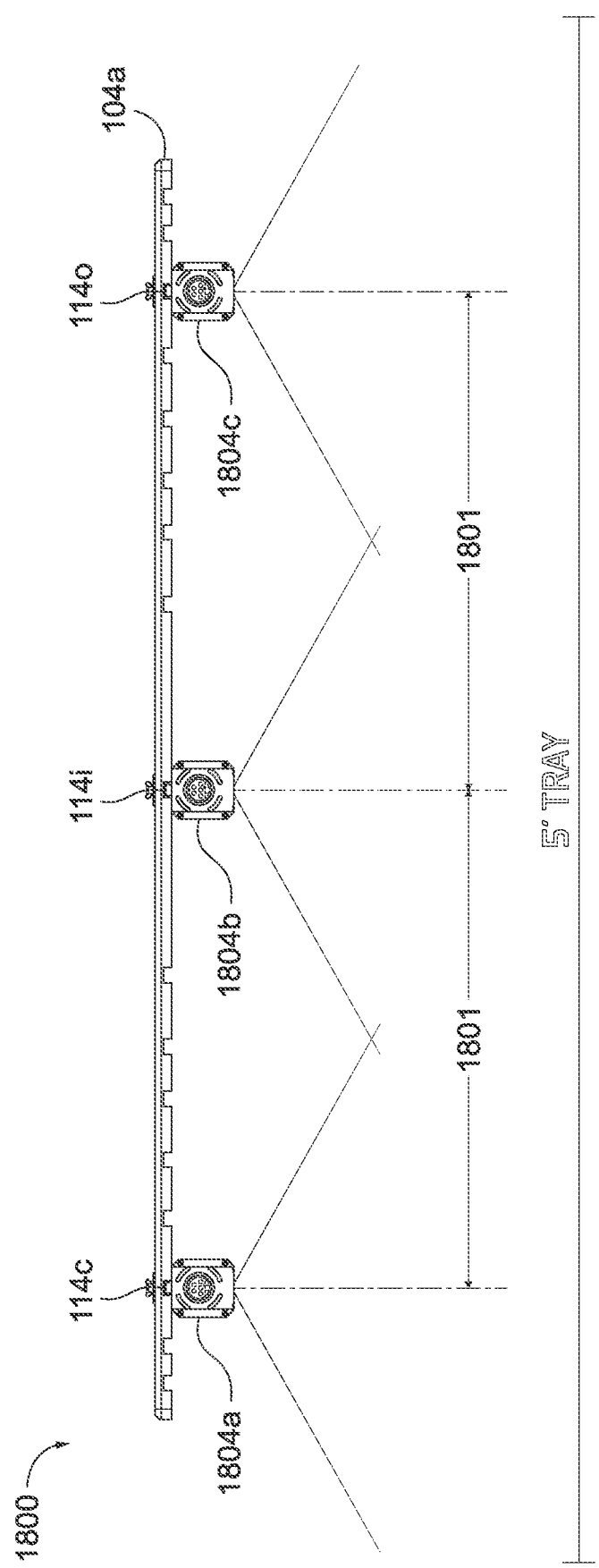

FIG. 18 depicts the mounting bracket system of FIG. 1 supporting a collection of light fixtures in another example growing environment.

Figure 19:
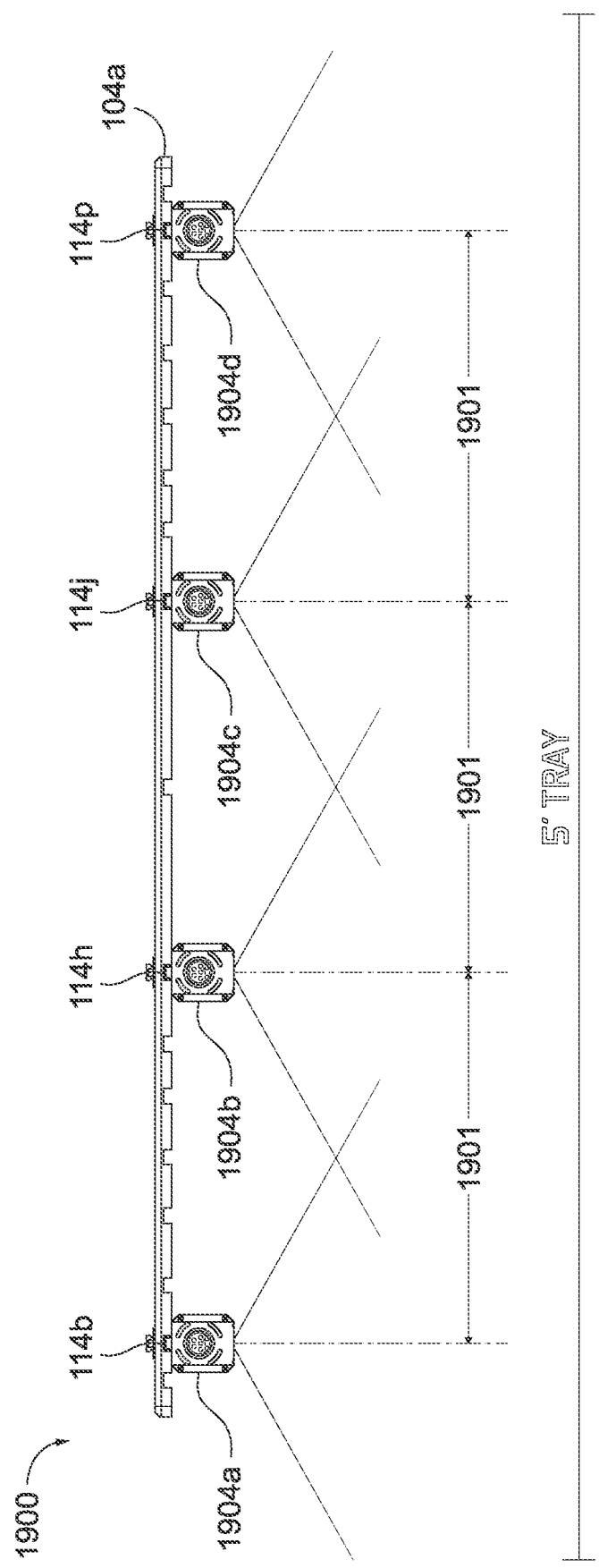

FIG. 19 depicts the mounting bracket system of FIG. 1 supporting a collection of light fixtures in another example growing environment.

Figure 20:
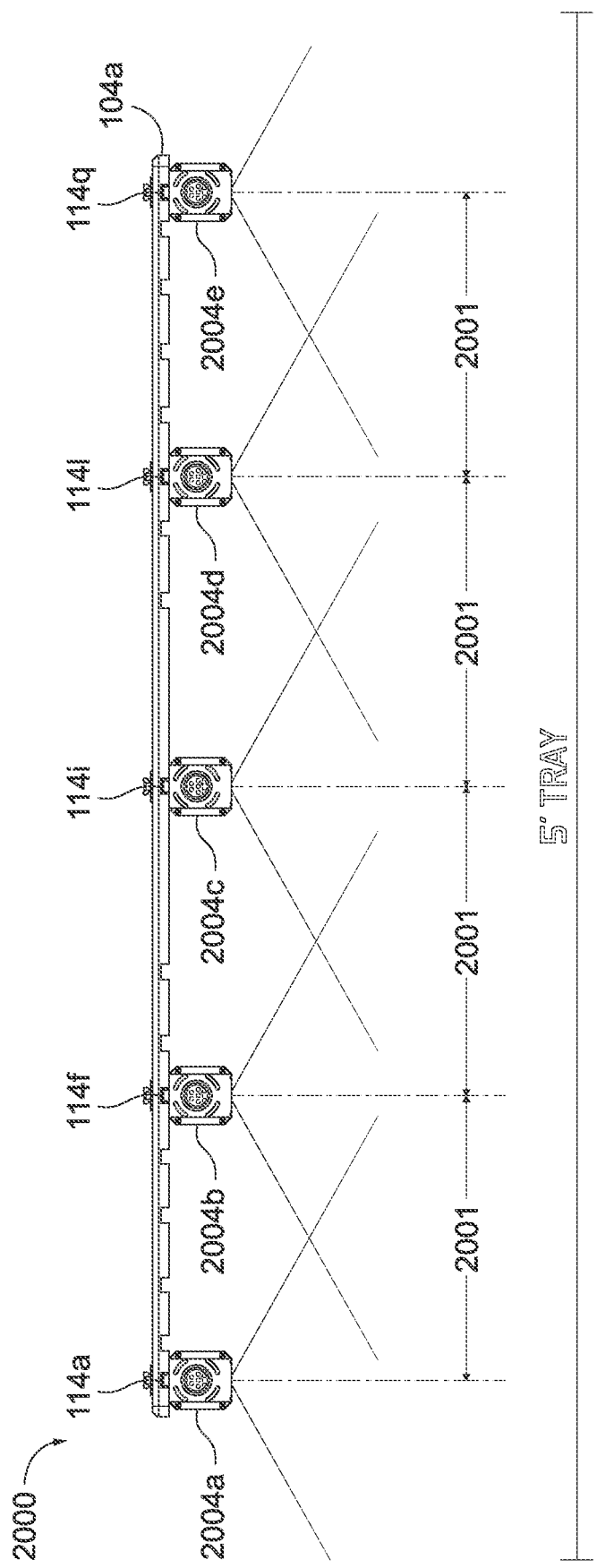

FIG. 20 depicts the mounting bracket system of FIG. 1 supporting a collection of light fixtures in another example growing environment.

Figure 21:
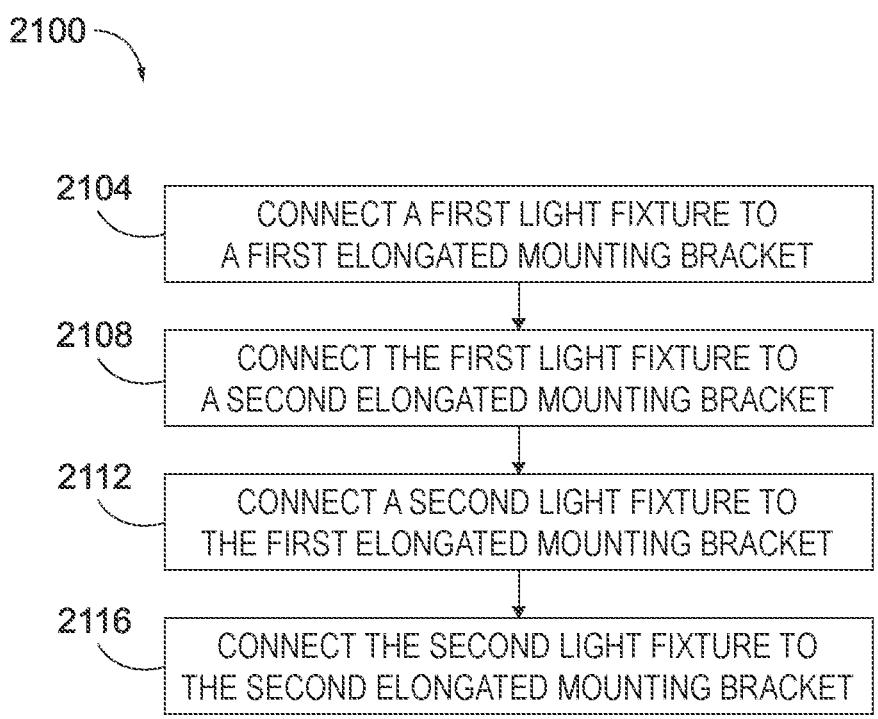

FIG. 21 depicts a flow diagram for supporting a collection of linear light fixtures.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to mounting brackets for a lighting system. An example mounting bracket may be used to secure a light fixture above a collection of plants, typically in an indoor or enclosed or partially enclosed environment. For example, the mounting bracket may be configured to be releasably secured to any of a variety of structural elements of a building or other structure that houses the plants. Structural or support-type elements may include, without limitation, trusses, beams, tubes, girts, purlins, rafters, and/or substantially any other element of the building that is capable of supporting the weight of one or more light fixtures and mounting hardware. Such support elements are often unsuited for the direct attachment of a light fixture due to a lack of an appropriate interface between the support element and light fixture. Further, the support elements may be positionally fixed in the building, and thus are generally not adaptable to support one or more light fixtures at a desired spacing above plants growing below the support elements.

The mounting bracket of the present disclosure may mitigate such hindrances by structurally supporting one or more light fixtures at a desired position using the existing infrastructure or support elements of an indoor structure. In this way, the light fixture is supportable above plants using the existing structural members, while also be arrangeable along a spectrum of lateral positions beyond the fixed position of the structural member. Thus, the mounting bracket of the present disclosure may define an interface between a light fixture and the structural member of the building for mounting and securing the light fixture to the structural member. The mounting bracket of the present disclosure may also allow the light fixture to be arranged at any of a plurality of positions that are offset from the structural member such that the light fixture may be arranged at a desired location.

Further, it is often desirable in growing operations to use multiple light fixtures to provide energy to plants that are arranged in trays or bins. For the sake of a non-limiting example, plants can be disposed within and along a growing tray, such as a four foot or five foot wide tray. A single light fixture may not provide adequate energy to facilitate the growth of the plants disposed across the length and width of the tray, as the light dissipates with the inverse square of distance. Based on the needs of the plants, two, three, four, five, or more lights may be required to provide adequate energy and/or otherwise contribute to a healthy environment for the plants. However, where multiple lights fixtures are used, uneven or inconsistent spacing between the light fixtures can negatively affect plant health. For example, where light fixtures are positioned too close to one another, light spread from each fixture may overlap and produce zones of concentrated energy that could deplete plant nutrients or dehydrate and scorch some of the plants. Conversely, where light fixtures are positioned too far apart from one another, light spread from each fixture may fail to reach certain segments of the plants and produce zones of suboptimal energy. The structural support members of buildings are often unsuited to mounting lights at a desired, substantially even spacing to facilitate plant growth, such as where the structural support members are spaced too far apart or too close together. Nor are the structural support members adaptable to accommodate different spacing requirements, for example, at a first spacing for a first plant variety best grown with two light fixtures, and at a second spacing for a second plant variety best grown with three light fixtures for greater energy intensity, and so on.

The mounting bracket of the present disclosure may be configured to mount a collection of light fixtures to one or more existing structural members at a desired spacing. In this regard, the mounting bracket may be configured to provide an interface between the collection of light fixtures and the support member, as described above, and also allow multiple light fixtures to be arranged at any of a plurality of positions that are laterally offset from the structural member or support element of the building. Further, the mounting bracket may be configured to define a set, substantially uniform spacing between the light fixtures mounted to mounting bracket. For example, the plurality of positions may be preset or defined by the mounting bracket to mount the light fixtures at positions along the bracket that generally minimize zones of energy concentration and/or suboptimal energy zones for a given growing operation. In this regard, the mounting bracket may be adaptable to accommodate different growing setups, such as a two-light, three-light, four-light, and/or five-light setup, or others, arranged for each of a four-foot, five-foot, or other width tray, and define a consistent spacing between each light of the setup.

To facilitate the foregoing, the mounting bracket may be formed from one or more pieces of material, such as steel, aluminum, and/or certain alloys that are configured to support the weight of one or more light fixtures. Composites, high-temperature plastics, resins, and synthetic materials may also be appropriate materials for forming the mounting bracket based on a given application. The piece of material may form a body portion of the mounting bracket that defines an elongated shape extending along an axial direction. A section of the body portion, such as a center section, may be configured for releasable attachment to the structural support member of the building, such as via one or more fastening structures, screws, bolts, nuts, and so on, as described herein. The body member may extend along the axial direction from the support member of the building in any appropriate direction.

The body member may include a plurality of channels, grooves and/or other features within a bottom side of body member. The body member may further include a plurality of holes or through portions extending from a top side of the body member, through a thickness of the body member, and into corresponding ones of the channels. Broadly, one or more of the channels may be configured to receive a mounting portion of a linear light fixture. The corresponding hole may be configured to receive a fastening structure therethrough for engagement with the mounting portion received in the channel. The fastening structure may be manipulated to releasably secure the light fixture to the mounting bracket at the channel such that the light fixture is structurally supported by the mounting bracket.

The plurality of channels may be spaced apart along the axial direction of the elongated shape of the body portion. The axial direction extends from the support structure of the building. Accordingly, the fixture may be secured to the mounting bracket at a position that is spaced apart or laterally separated from the support structure. Further, the plurality of channels may be spaced apart along the axial direction of the mounting bracket and at predetermined intervals that are configured to define a consistent spacing between two or more light fixtures that are secured to the mounting bracket. For example, a first subset of channels may be configured to define a two-light spacing for two lights secured by the bracket, a second subset of channels may be configured to define a three-light spacing for three lights held by the bracket, a third subset of channels may be configured to define a four-light spacing for four light held by the bracket, a fourth subset of channels may be configured to define a five-light spacing for five lights held by the bracket, and so on.

In some cases, the mounting bracket may be a component or subassembly of a mounting system, including multiple light fixtures and mounting brackets that support a growing operation. For example, a mounting system may include multiple light fixtures that are structurally supported via multiple mounting brackets of the present disclosure. As one example, a system may include a first mounting bracket and a second mounting bracket, each secured to one or more support structures of a building and oriented substantially along a first direction. The system may further include a first light fixture secured to each of the first and second mounting brackets and generally laterally offset or separated from the support structure. The system may further include a second light fixture secured to each of the first and second mounting brackets and generally laterally offset or separated from the support structure. The first and second mounting brackets may be configured to arrange the first and second light fixtures a desired spacing from one another, such as at a spacing required for a two-light setup. The first and second mounting bracket may be further configured to maintain a uniform spacing along an entire length of the first and second light fixtures, which may promote uniform plant growth, as described herein.

Reference will now be made to the accompanying drawings, which assist in illustrating various features of the present disclosure. The following description is presented for purposes of illustration. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts a mounting bracket system 100 connected to a support structure 190. The mounting bracket system 100 is configured support a collection of light fixtures 170 using mounting brackets 104, such as any of the mounting brackets discussed above and described in greater detail below. The mounting brackets 104 may be configured to structurally support the collection of light fixtures 170 above plants in a growing operation using the existing infrastructure or support elements of a building or other structure that encloses or partially encloses a growing area of the plants. For example, and as shown in FIG. 1, the mounting brackets 104 are coupled to the support structure 190 and the collection of light fixtures 170 and structurally support the collection of light fixtures 170 via the support structure 190. For purposes of illustration, the support structure 190 may be a component, segment, or the like of the existing building infrastructure, for example, a mounting rail suspended from the ceiling infrastructure. In this regard, while FIG. 1 shows the support structure 190 as a substantially square and slotted metal tubing, it will be appreciated that the support structure 190 may be representative of any of the support elements or structural members described herein. Further, the support structure 190 may be a single element or a group of elements, as shown in FIG. 1, based on the construction of the building.

In the example of FIG. 1, the mounting brackets 104 include a first mounting bracket 104*a*, a second mounting bracket 104*b*, a third mounting bracket 104*c*, and a fourth mounting bracket 104*d*. While four mounting brackets of the present disclosure are shown for purposes of illustration, it will be appreciated that more or fewer mounting brackets may be used, including systems in which one, two, three, or more than four mounting brackets are used. Each of the mounting brackets 104*a*-104*d* are coupled to the support structure 190 parallel to each other at a same mounting point such that each of the mounting brackets 104*a*-104*d* extends a same distance laterally on each side of the support structure 190. For example, and with reference to the first mounting bracket 104*a*, a connection portion 128 of the first mounting bracket 104*a* may be releasably secured to the support structure 190 via a fastening structure 134. Broadly, the fastening structure 134 may include a variety of different screws, bolts, nuts, sleeves, washers, clamps, and so on, and combinations thereof. As described in the greater detail below, the fastening structure 134 may include a threaded shafted that operates to secure the first mounting bracket 104a and any associate light fixture to one another. The mounting brackets 104b-104d may be coupled to the support structure 190 substantially analogously.

The mounting brackets 104 may be configured to structurally support the collection of light fixtures 170. In the example of FIG. 1, the collection of light fixtures 170 includes a first light fixture 170a, a second light fixture 170b, a third light fixture 170c, a fourth light fixture 170d, a fifth light fixture 170e, and a sixth light fixture 160f. While six light fixtures are shown for purposes of illustration, it will be appreciated that more or fewer light fixtures may be used. Each of the light fixtures 170a-170f are coupled to one or more of the mounting brackets 104. For example, the first light fixture 170a may be coupled to the first and second mounting brackets 104a, 104b at first locations along the mounting brackets 104a, 104b and laterally offset from the support structure 190. The second light fixture 170b may be coupled to the first and second mounting brackets 104a, 104b at second locations along the mounting brackets 104a, 104b and generally aligned with the support structure 190. The third light fixture 170c may be coupled to the first and second mounting bracket 104a, 104b at third locations along the mounting brackets 104a, 104b and laterally offset from the support structure 190, opposite the first light fixture 170a. The fourth, fifth, sixth light fixtures 170d-170f may be coupled to the third and fourth mounting brackets 104c, 104d substantially analogously.

The fourth, fifth, sixth light fixtures 170d-170f may generally be arranged in series with corresponding ones the first, second, third light fixtures 170a-170c. For example, the first light fixture 170a and the fourth light fixture 170d may be arranged end-to-end and establish an electrical connection 172 with one another. In this regard, current and control signals to the first light fixture 170a may be passed directly to the fourth light fixture 170d, or vice versa, via the electrical connection 172. The second light fixture 170b and the fifth light fixture 170e, and the third light fixture 170c and the sixth light fixture 170f may be electrically coupled to one another in a similar manner. The fourth light fixture 170d may be electrically coupled to the fifth light fixture 170e using a jumper or pigtail cable (not shown). Similarly, the second light fixture 170b may be electrically coupled to the third light fixture 170c using a second jumper or pigtail cable (not shown). In this configuration, a single electrical and control input at the free coupling end of the first light fixture 170a can be used to power and control the entire collection of light fixtures 170.

Additional light fixtures can be electrically coupled to the light fixtures 170 (and supported by additional mounting brackets) based on the needs of a growing operation. For example, a growing operation supported by the system 100 of FIG. 1 may generally have lighting along a length corresponding to approximately two lengths of a given light fixture. In some cases, the growing operation may use light along a length corresponding to a single length of a light fixture, and thus the light fixtures 170d-170f may be omitted. In yet other cases, the growing operation may require light along a length corresponding to a length of three, four, or more lengths of a light fixture, and thus additional light fixtures can be added, and electrically coupled at coupling ends 174, that are in turn support by additional mounting brackets via the support structure 190. In this regard, the system 100 may be a modular system in which components, e.g., light fixtures, mounting structures, fastening structures, and so on, can be added or removed as needed to provide a customized system to the needs of the growing operation. The system is further customizable to define a set, and consistent spacing between each of the collection of light fixtures 170, as described with respect to FIGS. 13-20.

For purposes of illustration, the first mounting bracket 104a of FIGS. 6-12 is described below. It will be appreciated that the second, third, fourth mounting brackets 104b-104d may be substantially similar, with changes in mounting location. With reference to FIG. 6, the first mounting bracket 104a may be formed from one or more pieces of material. The one or more pieces of material may be sufficiently strong and rigid to support one or more light fixtures. In some case, the first mounting bracket 104a may be formed as one-piece or monocoque structure. As shown in FIG. 6, the one or more pieces of material may form the first mounting bracket 104a including a body portion 106. The body portion 106 may have an elongated shape that extends along an axial direction between a body first end 107 and a body second end 108. The body portion 106 may further define a top side 109 and a bottom side 110. The bottom side 110 may oppose the top side 109, as shown in FIG. 6. The body portion 106 may include a plurality of channels 114. The plurality of channels 114 may be formed as notches, grooves, cuts, slots, and the like that extend depth-wise at least partially into a thickness of the body portion 106. Further, the plurality of channels 114 may extend lengthwise substantially transverse from the axial direction defined by the body portion 106. One or more channels of the plurality of channels 114 may be configured to receive a mounting portion of a light fixture, as described herein.

As shown in FIGS. 6 and 9, the plurality of channels 114 may include separate or discrete channels that are disposed along the axial direction of the body portion 106. For example, the plurality of channels 114 may be defined by the body portion 106 within the bottom side 110. In the present example, the plurality of channels 114 may include a first channel 114a, a second channel 114b, a third channel 114c, a fourth channel 114d, a fifth channel 114e, a sixth channel 114f, a seventh channel 114g, an eighth channel 114h, a ninth channel 114i, a tenth channel 114j, an eleventh channel 114k, a twelfth channel 114l, a thirteenth channel 114m, a fourteenth channel 114n, a fifteenth channel 114o, a sixteenth channel 114p, and a seventeenth channel 114q. In other examples, the body portion 106 may define more or fewer channels.

Further and with reference to FIGS. 7 and 8, the body portion 106 may define a plurality of holes 124. The plurality of holes 124 may include any number of through holes extending through a thickness of the body portion 106. The plurality of holes 124 may extend through a thickness of the body portion 106 and into a corresponding channel of the plurality of channels 114. One or more holes of the plurality of holes 124 may be configured to receive a fastening structure, as described herein.

As shown in FIGS. 7 and 8, the plurality of holes 124 may include separate or discrete openings that are disposed along the axial direction of the body portion 106. For example, the plurality of holes 124 may be defined by the body portion 106 within the top side 109 and extending through to open within a corresponding channel in the bottom side 110. In the present example, the plurality holes 124 may include a first hole 124a, a second hole 124b, a third hole 124c, a fourth hole 124d, a fifth hole 124e, a sixth hole 124f, a seventh hole 124g, an eighth hole 124h, a ninth hole 124i, a tenth hole 124j, an eleventh hole 124k, a twelfth hole 124l, a thirteenth hole 124m, a fourteenth hole 124n, a fifteenth hole 124o, a sixteenth hole 124p, and a seventeenth hole 124*q*. In other examples, the body portion 106 may define more or fewer holes that may or may not all be positioned within a corresponding channel 114.

The first mounting bracket 104*a* may be coupled to any of the light fixtures described herein at a channel of the plurality of channels 114. For example, the light fixture may include a mounting portion that is received by the channel of the plurality of channels 114. The mounting portion may have a complimentary shape that slides into or otherwise engages one or more surfaces of the channel. The corresponding hole of the plurality of holes 124 may extend into the one channel and direct a fastening structure to the mounting portion received therein. The fastening structure may engage the mounting portion and be manipulated to positionally fix the light fixture relative to the first mounting structure 104*a* and the support structure 190.

This relationship is illustrated with reference to FIGS. 2 and 3. As shown in the detail view of FIG. 2, the first mounting bracket 104*a* is illustrated in the system 100 coupled to the support structure 190 and the second light fixture 170*b*. For purposes of illustration, the second light fixture 170*b* and the relationship of the second light fixture 170*a* to the first mounting bracket 104*a* is described below. It will be appreciated that the first light fixture 170*a* and third, fourth, fifth, sixth light fixtures 170*c*-170*f* may be substantially similar, with changes in mounting location. For example, the second light fixture 170*b* is shown as including an outer housing 176, an inner housing 177, an illuminating element 178, a frame 179, and a lamp cover or diffuser 175. The outer and inner housings 176, 177 may cooperate to define structural components of the second light fixture 170*b* that house electrical components of the light fixture 170*b*. The illuminating element 178 (e.g., an LED array) may be arranged relative to one or both of the housings 176, 177 and is configured to emit light from the light fixture 170*b* through the diffuser 175, which is held by the frame 179. The illuminating element 178 may be or include or be associated with any appropriate component that allows the second light fixture 170*b* to deliver energy to plants, such as a thermal and ultraviolet energy. In this regard, the illuminating element 178 may be used to deliver full spectrum wavelength across a range of input power. It will be appreciated that a variety of different internal light fixture components may be used without departing from the scope of present disclosure.

As shown in FIGS. 2 and 3, the second light fixture 170*b* may also include a mounting portion 180. The mounting portion 180 may be an elongated mounting portion that extends along an axial direction of the linear light fixture. Broadly, the mounting portion 180 may be any appropriate structure that is adapted to be received by, or otherwise engage, a channel of the plurality of channels 114 for securement therein. In the example shown in FIG. 3, the mounting portion 180 includes a track 181. The track 181 may include two substantially L-shaped members that run along at least a portion of the length of the second light fixture 170*b*. The two-L-shaped members of the track 181 may cooperate to define a pocket 182 and a receiving slot 183 extending into the pocket 182. The receiving slot 183 may be narrower in width than the pocket 182, as defined by the L-shaped members. An axial end 185, shown in FIG. 2, may be open or manipulable to define an opening into the pocket 182. In this regard, the pocket 182 may be configured to receive a fastening structure 134 or feature at the axial end 185 that includes a feature with a width greater than that defined by the receiving slot 183 configured to fit within the pocket 182. The fastening structure 134 can in turn be advanced down the axial length of the mounting portion 180 and prevented from separation from the mounting portion 180 in one direction by the track 181, as the fastening structure 134 has at least one width greater than that of the receiving slot 183.

To illustrate the foregoing and with continued reference to FIG. 3, the fastening structure 134 is shown in a configuration in which the fastening structure 134 operates to secure the second light fixture 170*b*, the first mounting bracket 104*a*, and the support structure 190 to one another. As illustrated, the fastening structure 134 includes a shaft 135, a head 136, a receiving end 137, a nut 138, washer 139, a sleeve 140, and an alignment block 141. The shaft 135 may be an elongated structure that includes exterior threads (e.g., a bolt). The head 136 may be a nut, cap or other structure that is screwed onto or permanently affixed to, or a unitary part of a first end of the shaft 135. In some cases, the shaft 135 and the head 136 can be portion of a single unitary structure, such as a bolt. The shaft 135 may include a receiving end 137 opposite the head 136. In the example of FIG. 3, the shaft 135 may have a length sufficient to extend through the mounting portion 180, the first mounting bracket 104*a*, and the support structure 190, such that the receiving end 137 protrudes from the support structure 190 opposite the second light fixture 170*b*.

In this regard, the shaft 135 and the head 136 may facilitate the coupling of the second light fixture 170*b* to the first mounting structure 104*a* and the support structure 190. As shown in FIG. 3, the head 136 may be positioned in the pocket 182 of the mounting portion 180. For example, the head 136 may be introduced to the mounting portion 180 at the axial end 185 and slid along the track 181 as appropriate. The shaft 135 may extend from the head 136 and through the receiving slot 183. While the shaft 135 and head 136 may slide along the track 181, the receiving slot 183 may prevent separation or exit of the fastening structure 134 in at least one direction away from the mounting portion 180.

The mounting portion 180 may in turn be received by a channel of the plurality of channels 114 described herein. In the example of FIG. 3, the mounting portion 180 is received by the ninth channel 114*i*. The mounting portion 180 may be received by the ninth channel 114*i* in a manner that generally aligns the protruding shaft 135 with the ninth hole 124*i*, which is disposed in the ninth channel 114*i*. Accordingly, the mounting portion 180 may be received in the ninth channel 114*i* and the shaft 135 may be received by, and extend through, the ninth hole 124*i*.

The fastening structure 134 is operable in FIG. 3 to couple the second light fixture 170*b* and the first mounting bracket 104*a* to the support structure 190. In this regard, the shaft 135 may be further arranged to extend into and through the support structure 190. For example, and as shown in FIG. 3, the support structure 190 may include a tubular body 192 that defines a tube volume 194, a bottom opening slot 195, and top openings 196. The bottom opening slot 195 may be an opening extending into the tube volume and extend generally along the entire axial length of the support structure 190. The top openings 196 may include discrete openings disposed along the axial length of the support structure 190. The shaft 135 of the fastening structure 134 may be arranged to extend through the bottom opening slot 195 and tube volume 194 and exit the tube volume 194 through one of the top openings 196 such that the receiving end 137 protrudes from the support structure 190 opposite the first mounting bracket 104*a*. Within the tube volume 194, the shaft 135 may extend through an alignment block 141 and a sleeve 140 and/or other any other component that may facilitate maintaining the shaft 135 in a generally perpendicular orientation within the tube volume 194. The washer 139, nut 138, and/or other appropriate component may be advanced and threaded onto the shaft 135 at the receiving end 137. The nut 138 may be tightened to secure the second light fixture 170*b* in the ninth channel 114*i*. For example, by advancing the nut 138, a portion of the track 181, the first mounting bracket 104*a*, the alignment block 141, the sleeve 140, a portion of the support structure 190, and the washer 139 may be compressed between the nut 138 and the head 136 to secure the second light fixture 170*b*, the first mounting bracket 104*a*, and the support structure 190.

The first mounting bracket 104*a*, and the other mounting brackets described herein, may also be configured to couple with a light fixture that is arranged laterally offset from the support structure 190. With reference to FIGS. 4 and 5, the first mounting bracket 104*a* is shown coupled with the third light fixture 170*c*. The third light fixture 170*c* may be substantially analogous to the second light fixture 170*b* described above and include a mounting portion 180*c*, a track 181*c*, a pocket 182*c*, and a receiving slot 183*c*. The mounting portion 180*c* may be received within a channel of the plurality of channels 114. For example, and as shown in FIG. 5, the mounting portion 180*c* may be received in the fourteenth channel 114*n*. The fastener 144 may be used to secure the mounting portion 180*c* in the fourteenth channel 114*n*. For example, the fastener 144 may be substantially analogous to the fastening structure 134 and include a shaft 145, a head 146, a receiving end 147, a nut 148, and a washer 149. Like the examples described above, the head 146 may be received in the pocket 182*c* and the shaft 145 may extend through the receiving slot 183*c* and the fourteenth hole 124*n* such that the receiving end 147 protrudes from the top side 109 of the first mounting bracket 104*a*. The washer 149 and the nut 148 may be advanced onto the shaft 145 at the receiving end 147. The nut 148 may be tightened to compress a portion of the mounting portion 180*c*, the first mounting bracket 104*a*, and the washer 149 between the nut 148 and the head 146, thereby securing and positionally fixing the third light fixture 170*c* relative to the first mounting bracket 104*a*.

The mounting brackets of the present disclosure may be used to define a set, consistent, and/or even spacing between light fixtures held by the mounting bracket. For example, the plurality of channels 114 can be disposed at increments along the axial length of the first mounting bracket 104*a* such that a subset of the channels 114 can be used to mount light fixtures at a predetermined set spacing. The set spacing may be based on the total number of light fixtures mounted to the mounting bracket 104*a*. The set spacing may also be based on the length of size of the growing tray that is illuminated by the light fixtures.

To illustrate the foregoing, FIGS. 13-16 illustrate the first mounting bracket 104*a* coupled to various numbers of light fixtures that illuminate a growing tray of a first size, such as a growing tray of four feet in width. The first mounting bracket 104*a* may be configured to define a predetermined spacing between light fixtures for arrangements of two light fixtures, three light fixtures, four light fixtures, and five light fixtures at constant and even spacings, based in part on the position of the plurality of channels 114 along the axial direction of the first mounting bracket 104*a*.

For example, and with reference to FIG. 13, a growing environment 1300 is shown. The growing environment 1300 may include an environment in which a first light fixture 1304*a* and a second light fixture 1304*b* are used to provide energy to a four-foot wide growing tray. The first mounting bracket 104*a* is shown in the growing environment 1300 coupled with the light fixtures 1304*a*, 1304*b*. For example, the first mounting bracket 104*a* may receive and couple with the first light fixture 1304*a* at the sixth channel 114*f*. The first mounting bracket 104*a* may receive and couple with the second light fixture 1304*b* at the twelfth channel 114*l*. With the first light fixture 1304*a* coupled to the first mounting bracket 104*a* at the sixth channel 114*f* and the second light fixture 1304*b* coupled to the first mounting bracket 104*a* at the twelfth channel 114*l*, the first mounting bracket 104*a* may define a two-light spacing 1301 between the first and second light fixtures 1304*a*, 1304*b*. In this regard, the sixth channel 114*f* and the twelfth channel 114*l* may be a first subset of channels of the plurality of channels 114 that define the two-light spacing 1301, or otherwise define a constant spacing between the first and second light fixtures 1304*a*, 1304*b* that is configured to provide appropriate and even illumination across and along the four-foot tray with two light fixtures, e.g., such as by reducing zones of the tray receiving a suboptimal amount of energy and preventing areas of excess intensity.

For example, and with reference to FIG. 14, a growing environment 1400 is shown. The growing environment 1400 may include an environment in which a first light fixture 1404*a*, a second light fixture 1404*b*, and a third light fixture 1404*c* are used to provide energy to a four-foot wide growing tray. The first mounting bracket 104*a* is shown in the growing environment 1400 coupled with the light fixtures 1404*a*-1404*c*. For example, the first mounting bracket 104*a* may receive and couple with the first light fixture 1404*a* at the fourth channel 114*d*. The first mounting bracket 104*a* may receive and couple with the second light fixture 1404*b* at the ninth channel 114*i*. The first mounting bracket 104*a* may receive and couple with the third light fixture 1404*c* at the fourteenth channel 114*n*. With the first light fixture 1404*a* coupled to the first mounting bracket 104*a* at the fourth channel 114*d*, the second light fixture 1404*b* coupled to the first mounting bracket 104*a* at the ninth channel 114*i*, and the third light fixture 1404*c* coupled to the first mounting bracket 104*a* at the fourteenth channel 114*n*, the first mounting bracket 104*a* may define a three-light spacing 1401 between the first and second light fixtures 1404*a*, 1404*b* and the second and third light fixtures 1404*b*, 1404*c*. In this regard, the fourth channel 114*d*, the ninth channel 114*i*, and the fourteenth channel 114*n* may be a second subset of channels of the plurality of channels 114 that define the three-light spacing 1401, or otherwise define a constant and even spacing between the light fixtures 1404*a*-1404*c* that is configured to provide appropriate and even illumination for the four-foot tray with three light fixtures, e.g., such as by reducing zones of the tray receiving a suboptimal amount of energy and preventing areas of excess intensity.

For example, and with reference to FIG. 15, a growing environment 1500 is shown. The growing environment 1500 may include an environment in which a first light fixture 1504*a*, a second light fixture 1504*b*, a third light fixture 1504*c*, and a fourth light fixture 1504*d* are used to provide energy to a four-foot wide growing tray. The first mounting bracket 104*a* is shown in the growing environment 1500 coupled with the light fixtures 1504*a*-1504*d*. For example, the first mounting bracket 104*a* may receive and couple with the first light fixture 1504*a* at the third channel 114*c*. The first mounting bracket 104*a* may receive and couple with the second light fixture 1504*b* at the eighth channel 114*h*. The first mounting bracket 104*a* may receive and couple with the third light fixture 1504*c* at the tenth channel 114*j*. The first mounting bracket 104*a* may receive and couple with the fourth light fixture 1504*d* at the fifteenth channel 114*o*. With the first light fixture 1504*a* coupled to the first mounting bracket 104*a* at the third channel 114*c*, the second light fixture 1504*b* coupled to the first mounting bracket 104*a* at the eighth channel 114*h*, the third light fixture 1504*c* coupled to the first mounting bracket 104*a* at the tenth channel 114*j*, and the fourth light fixture 104*d* coupled to the first mounting bracket 104*a* at the fifteenth channel 114*o*, the first mounting bracket 104*a* may define a four-light spacing 1501 between the first and second light fixtures 1504*a*, 1504*b*, the second and third light fixtures 1504*b*, 1504*c*, and the third and fourth light fixtures 1504*c*, 1504*d*. In this regard, the third channel 114*c*, the eighth channel 114*h*, the tenth channel 114*j*, and the fifteenth channel 114*o*, may be a third subset of channels of the plurality of channels 114 that define the four-light spacing 1501, or otherwise define a constant and even spacing between the light fixtures 1504*a*-1504*d* that is configured to provide appropriate and even illumination for the four-foot tray with four light fixtures, e.g., such as by reducing zones of the tray receiving a suboptimal amount of energy and preventing areas of excess intensity.

For example, and with reference to FIG. 16, a growing environment 1600 is shown. The growing environment 1600 may include an environment in which a first light fixture 1604*a*, a second light fixture 1604*b*, a third light fixture 1604*c*, a fourth light fixture 1604*d*, and a fifth light fixture 1604*e* are used to provide energy to a four foot tray. The first mounting bracket 104*a* is shown in the growing environment 1600 coupled with the light fixtures 1604*a*-1604*e*. For example, the first mounting bracket 104*a* may receive and couple with the first light fixture 1604*a* at the third channel 114*c*. The first mounting bracket 104*a* may receive and couple with the second light fixture 1604*b* at the seventh channel 114*g*. The first mounting bracket 104*a* may receive and couple with the third light fixture 1604*c* at the ninth channel 114*i*. The first mounting bracket 104*a* may receive and couple with the fourth light fixture 1604*d* at the eleventh channel 114*k*. The first mounting bracket 104*a* may receive and couple with the fifth light fixture 1604*e* at the fifteenth channel 114*o*. With the first light fixture 1604*a* coupled to the first mounting bracket 104*a* at the third channel 114*c*, the second light fixture 1604*b* coupled to the first mounting bracket 104*a* at the seventh channel 114*g*, the third light fixture 1604*c* coupled to the first mounting bracket 104*a* at the ninth channel 114*i*, the fourth light fixture 1604*d* coupled to the first mounting bracket 104*a* at the eleventh channel 114*k*, and the fifth light fixture 1604*e* coupled to the first mounting bracket 104*a* at the fifteenth channel 114*o*, the first mounting bracket 104*a* may define a five-light spacing 1601 between each of the light fixtures 1604*a*-1604*e*. In this regard, the third channel 114*c*, the seventh channel 114*g*, the ninth channel 114*i*, the eleventh channel 114*k*, and the fifteenth channel 114*o* may be a fourth subset of channels of the plurality of channels 114 that define the five-light spacing 1601, or otherwise define a constant and even spacing between the light fixtures 1604*a*-1604*e* that is configured to provide appropriate and even illumination for the four-foot tray with five light fixtures, e.g., such as by reducing zones of the tray receiving a suboptimal amount of energy and preventing areas of excess intensity.

Turning to FIGS. 17-20, the first mounting bracket 104*a* is shown coupled to various numbers of light fixtures that illuminate a growing tray of a second size, such as a growing tray of five feet in width. The first mounting bracket 104*a* may be configured to define a predetermined spacing between light fixtures for arrangements of two light fixtures, three light fixture, four light fixtures, and five light fixtures at constant and even spacings, based in part on the position of the plurality of channels 114 along the axial direction of the first mounting bracket 104*a*.

For example, and with reference to FIG. 17, a growing environment 1700 is shown. The growing environment 1700 may include an environment in which a first light fixture 1704*a* and a second light fixture 1704*b* are used to provide energy to a five-foot wide growing tray. The first mounting bracket 104*a* is shown in the growing environment 1700 coupled with the light fixtures 1704*a*, 1704*b*. For example, the first mounting bracket 104*a* may receive and couple with the first light fixture 1704*a* at the fifth channel 114*e*. The first mounting bracket 104*a* may receive and couple with the second light fixture 1704*b* at the thirteenth channel 114*m*. With the first light fixture 1704*a* coupled to the first mounting bracket 104*a* at the fifth channel 114*e* and the second light fixture 1704*b* coupled to the first mounting bracket 104*a* at the thirteenth channel 114*m*, the first mounting bracket 104*a* may define a two-light spacing 1701 between the first and second light fixtures 1704*a*, 1704*b*. In this regard, the fifth channel 114*e* and the thirteenth channel 114*m* may be another first subset of channels of the plurality of channels 114 that define the two-light spacing 1701, or otherwise define a constant and even spacing between the first and second light fixtures 1704*a*, 1704*b* that is configured to provide appropriate and even illumination for the five-foot tray with two light fixtures, e.g., such as by reducing zones of the tray receiving a suboptimal amount of energy and preventing areas of excess intensity.

For example, and with reference to FIG. 18, a growing environment 1800 is shown. The growing environment 1800 may include an environment in which a first light fixture 1804*a*, a second light fixture 1804*b*, and a third light fixture 1804*c* are used to provide energy to a five-foot wide growing tray. The first mounting bracket 104*a* is shown in the growing environment 1800 coupled with the light fixtures 1804*a*-1804*c*. For example, the first mounting bracket 104*a* may receive and couple with the first light fixture 1804*a* at the third channel 114*c*. The first mounting bracket 104*a* may receive and couple with the second light fixture 1804*b* at the ninth channel 114*i*. The first mounting bracket 104*a* may receive and couple with the third light fixture 1804*c* at the fifteenth channel 114*o*. With the first light fixture 1804*a* coupled to the first mounting bracket 104*a* at the third channel 114*c*, the second light fixture 1804*b* coupled to the first mounting bracket 104*a* at the ninth channel 114*i*, and the third light fixture 1804*c* coupled to the first mounting bracket 104*a* at the fifteenth channel 114*o*, the first mounting bracket 104*a* may define a three-light spacing 1801 between the first and second light fixtures 1804*a*, 1804*b* and the second and third light fixtures 1804*b*, 1804*c*. In this regard, the third channel 114*c*, the ninth channel 114*i*, and the fifteenth channel 114*o* may be another second subset of channels of the plurality of channels 114 that define the three-light spacing 1801, or otherwise define a constant and even spacing between the light fixtures 1804*a*-1804*c* that is configured to provide appropriate and even illumination for the five-foot tray with three light fixtures, e.g., such as by reducing zones of the tray receiving a suboptimal amount of energy and preventing areas of excess intensity.

For example, and with reference to FIG. 19, a growing environment 1900 is shown. The growing environment 1900 may include an environment in which a first light fixture 1904*a*, a second light fixture 1904*b*, a third light fixture 1904*c*, and a fourth light fixture 1904*d* are used to provide energy to a five-foot wide growing tray. The first mounting bracket 104*a* is shown in the growing environment 1900 coupled with the light fixtures 1904*a*-1904*d*. For example, the first mounting bracket 104*a* may receive and couple with the first light fixture 1904*a* at the second channel 114*b*. The first mounting bracket 104*a* may receive and couple with the second light fixture 1904*b* at the eighth channel 114*h*. The first mounting bracket 104*a* may receive and couple with the third light fixture 1904*c* at the tenth channel 114*j*. The first mounting bracket 104*a* may receive and couple with the fourth light fixture 1904*d* at the sixteenth channel 114*p*. With the first light fixture 1904*a* coupled to the first mounting bracket 104*a* at the second channel 114*b*, the second light fixture 1904*b* coupled to the first mounting bracket 104*a* at the eighth channel 114*h*, the third light fixture 1904*c* coupled to the first mounting bracket 104*a* at the tenth channel 114*j*, and the fourth light fixture 104*d* coupled to the first mounting bracket 104*a* at the sixteenth channel 114*p*, the first mounting bracket 104*a* may define a four-light spacing 1901 between the first and second light fixtures 1904*a*, 1904*b*, the second and third light fixtures 1904*b*, 1904*c*, and the third and fourth light fixtures 1904*c*, 1904*d*. In this regard, the second channel 114*b*, the eighth channel 114*h*, the tenth channel 114*j*, and the sixteenth channel 114*p*, may be another third subset of channels of the plurality of channels 114 that define the four-light spacing 1901, or otherwise define a constant and even spacing between the light fixtures 1904*a*-1904*d* that is configured to provide appropriate and even illumination for the five-foot tray with four light fixtures, e.g., such as by reducing zones of the tray receiving a suboptimal amount of energy and preventing areas of excess intensity.

For example, and with reference to FIG. 20, a growing environment 2000 is shown. The growing environment 2000 may include an environment in which a first light fixture 2004*a*, a second light fixture 2004*b*, a third light fixture 2004*c*, a fourth light fixture 2004*d*, and a fifth light fixture 2004*e* are used to provide energy to a five-foot wide growing tray. The first mounting bracket 104*a* is shown in the growing environment 2000 coupled with the light fixtures 2004*a*-2004*e*. For example, the first mounting bracket 104*a* may receive and couple with the first light fixture 2004*a* at the first channel 114*a*. The first mounting bracket 104*a* may receive and couple with the second light fixture 2004*b* at the sixth channel 114*f*. The first mounting bracket 104*a* may receive and couple with the third light fixture 2004*c* at the ninth channel 114*i*. The first mounting bracket 104*a* may receive and couple with the fourth light fixture 2004*d* at the twelfth channel 114*l*. The first mounting bracket 104*a* may receive and couple with the fifth light fixture 2004*e* at the seventeenth channel 114*q*. With the first light fixture 2004*a* coupled to the first mounting bracket 104*a* at the first channel 114*a*, the second light fixture 2004*b* coupled to the first mounting bracket 104*a* at the sixth channel 114*f*, the third light fixture 2004*c* coupled to the first mounting bracket 104*a* at the ninth channel 114*i*, the fourth light fixture 2004*d* coupled to the first mounting bracket 104*a* at the twelfth channel 114*l*, and the fifth light fixture 2004*e* coupled to the first mounting bracket 104*a* at the seventeenth channel 114*q*, the first mounting bracket 104*a* may define a five-light spacing 2001 between each of the light fixtures 2004*a*-2004*e*. In this regard, the first channel 114*a*, the sixth channel 114*f*, the ninth channel 114*i*, the twelfth channel 114*l*, and the seventeenth channel 114*q* may be another fourth subset of channels of the plurality of channels 114 that define the five-light spacing 2001, or otherwise define a constant and even spacing between the light fixtures 2004*a*2004*e* that is configured to provide appropriate and even illumination for the five-foot tray with five light fixtures, e.g., such as by reducing zones of the tray receiving a suboptimal amount of energy and preventing areas of excess intensity.

To facilitate the reader's understanding of the various functionalities of the embodiments discussed herein, reference is now made to the flow diagram in FIG. 21, which illustrates process 2100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 2104, a first light fixture is connected to a first elongated mounting bracket. For example, and with reference to FIGS. 1 and 6, the first light fixture 170*a* may be connected to the first mounting bracket 104*a*. In one implementation, the mounting portion 180 of the first light fixture 170*a* can be received in a channel of the plurality of channels 114 of the mounting bracket. Further, a fastening structure may be advanced through a hole corresponding to the channel and used to secure the first light fixture 170*a* to the first mounting bracket 104*a*.

At operation 2108, the first light fixture is connected to a second elongated mounting bracket. For example, and with reference to FIGS. 1 and 6, the first light fixture 170*a* may be connected to the second mounting bracket 104*b*. In one implementation, the mounting portion 180 of the first light fixture 170*a* can be received in a channel of the plurality of channels 114 of the mounting bracket. Further, a fastening structure may be advanced through a hole corresponding to the channel and used to secure the first light fixture 170*a* to the second mounting bracket 104*b*.

At operation 2112, a second light fixture is connected to the first elongated mounting bracket. For example, and with reference to FIGS. 1 and 6, the second light fixture 170*a* may be connected to the first mounting bracket 104*a*. In one implementation, the mounting portion 180 of the second light fixture 170*b* can be received in a channel of the plurality of channels 114 of the mounting bracket. Further, a fastening structure may be advanced through a hole corresponding to the channel and used to secure the second light fixture 170*b* to the first mounting bracket 104*a*.

At operation 2116, the second light fixture is connected to the second elongated mounting bracket. For example, and with reference to FIGS. 1 and 6, the second light fixture 170*b* may be connected to the second mounting bracket 104*b*. In one implementation, the mounting portion 180 of the second light fixture 170*b* can be received in a channel of the plurality of channels 114 of the mounting bracket. Further, a fastening structure may be advanced through a hole corresponding to the channel and used to secure the second light fixture 170*a* to the second mounting bracket 104*b*.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Other examples and implementations are within the scope of the disclosure and appended claims. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A mounting bracket for a lighting system comprising:
a body portion having an elongated shape and defining a top side and a bottom side opposing the top side;
wherein the body portion defines:
within the bottom side, a plurality of channels spaced apart along an axial direction of the elongated shape, wherein one or more channels of the plurality of channels is configured to receive a mounting portion of a linear light fixture of the lighting system,
within the top side, a plurality of holes spaced apart along the axial direction corresponding to the plurality of channels, wherein one or more holes of the plurality of holes extends into a corresponding channel of the plurality of channels and is configured to receive a fastening structure therethrough; and
wherein the plurality of channels includes:
a first plurality of channels spaced apart by a first distance, and
a second plurality of channels different from the first plurality of channels, the second plurality of channels being spaced apart by a second distance, and wherein the first distance is different from the second distance.

2. The mounting bracket of claim 1, wherein the one or more channels extends partially through a thickness of the body portion from the bottom side.

3. The mounting bracket of claim 1, wherein the one or more channels extends substantially transverse to the axial direction.

4. The mounting bracket of claim 1, wherein the first plurality of channels define a two-light spacing between two linear light fixtures that are mountable to the mounting bracket at corresponding channels of the first plurality of channels.

5. The mounting bracket of claim 4, wherein the second plurality of channels define a three-light spacing between each of three linear light fixtures that are mountable to the mounting bracket at corresponding channels of the second plurality of channels.

6. The mounting bracket of claim 5, wherein the plurality of channels comprises a third plurality of channels spaced apart along the axial direction to define a four-light spacing between each of four linear light fixtures that are mountable to the mounting bracket at corresponding channels of the third plurality of channels.

7. The mounting bracket of claim 6, wherein the plurality of channels comprises a fourth plurality of channels spaced apart along the axial direction to define a five-light spacing between each of five linear light fixtures that are mountable to the mounting bracket at corresponding channels of the fourth plurality of channels, and wherein the second plurality of channels and the fourth plurality of channels comprise at least one common channel.

8. A mounting bracket system comprising
the mounting bracket of claim 1,
a linear light fixture having a mounting portion received in one channel of the plurality of channels, and
a fastening structure received through a hole of plurality of holes corresponding to the one channel and securing the mounting portion to the mounting bracket.

9. The mounting bracket system of claim 8, wherein
the mounting portion comprises a track defining a pocket and a receiving slot extending into the pocket and aligned with the hole,
a first end portion of the fastening structure is held in the pocket and constrained in a direction toward the mounting bracket by the receiving slot, and
a second end portion of the fastening structure extends through the receiving slot and the hole, protrudes from the mounting bracket at the top side, and is coupled with a securing component configured to prevent exit of the fastening structure through the hole in the mounting bracket.

10. The mounting bracket system of claim 9, wherein
the fastening structure comprises an elongated shaft configured to extend the second end portion through a support structure of a building, and
the securing component is coupleable with the second end to prevent exit of the elongated shaft from the mounting bracket and the support structure.

11. A mounting bracket system comprising:
a first linear light fixture having an elongated first mounting portion;
a second linear light fixture having an elongated second mounting portion;
a first mounting bracket having an elongated first shape and defining a plurality of first channels configured to receive the elongated first and second mounting portions; and
a second mounting bracket having an elongated second shape and defining a plurality of second channels configured to receive the elongated first and second mounting portions,
wherein the plurality of first channels and the plurality of second channels are configured to define a spacing between the first and second linear light fixtures; and
wherein the plurality of first channels and the plurality of second channels include:
a primary plurality of channels spaced apart by a first distance,
a secondary plurality of channels different from the primary plurality of channels, the secondary plurality of channels being spaced apart by a second distance, and wherein the first distance is different from the second distance.

12. The mounting bracket system of claim 11, wherein the plurality of first channels and the plurality of second channels are configured to substantially maintain the spacing along an entire length of the first and second linear light fixtures.

13. The mounting bracket system of claim 11, wherein the first and second plurality of channels are configured to receive the first and second mounting portions when oriented in a first direction with first and second mounting brackets extending along a second direction substantially perpendicular to the first direction.

14. The mounting bracket system of claim 13, wherein the first and second plurality of channels extend along the first direction.

15. The mounting bracket system of claim 11, wherein
the system further comprises a collection of fastening structures, and
a first channel of the first plurality of channels and the elongated first mounting structure is configured to receive a first fastening structure of the collection of fastening structures and secure the first mounting bracket and the first linear light fixture to one another, and
a second channel of the second plurality of channels and the elongated first mounting structure is configured to receive a second fastening structure of the collection of fastening structures and secure the second mounting bracket and the first linear light fixture to one another.

16. The mounting bracket system of claim 11, wherein
the first mounting bracket defines a first connection portion configured for mounting to a support structure of a building, and
the second mounting bracket defines a second connection portion configured for mounting to the support structure or another support structure of the building.

17. A method of supporting a collection of linear light fixtures, the method comprising:
connecting an elongated first mounting portion of a first linear light fixture to a one channel of a plurality of first channels of an elongated first mounting bracket, the plurality of first channels including a first subset of channels and a second subset of channels, the first subset of channels different from the second subset of channels, the first subset of channels being spaced apart by a first distance, the second subset of channels being spaced apart by a second distance different from the first distance;
connecting the elongated first mounting portion to one channel of a plurality of second channels of an elongated second mounting bracket, the plurality of second channels including a third subset of channels spaced apart by the first distance and a fourth subset of channels spaced apart by the second distance, the third subset of channels different from the fourth subset of channels;
connecting an elongated second mounting portion of a second linear light fixture to another channel of the plurality of first channels; and
connecting the elongated second mounting portion to another channel of the plurality of second channels.

18. The method of claim 17, further comprising
securing the first linear light fixture to the elongated first mounting bracket by engaging a first fastening structure with the one channel of the plurality of first channels and the elongated first mounting portion;
securing the first linear light fixture to the elongated second mounting bracket by engaging a second fastening structure with the one channel of the plurality of second channels and the elongated first mounting portion;
securing the second linear light fixture to the elongated first mounting bracket by engaging a third fastening structure with the another channel of the plurality of first channels and the elongated second mounting portion;
securing the second linear light fixture to the elongated second mounting bracket by engaging a fourth fastening structure with the another channel of the plurality of second channels and the elongated second mounting portion; and
securing at least one of the first or second mounting brackets to a support structure of a building using a fifth fastening structure or at least one of the first, second, third, or fourth fastening structures.

19. The method of claim 17, the method further comprises defining a two-light spacing between the first linear light fixture and the second linear light fixture, in part, by selecting the first channel and the another channel of the plurality of first channels from the first subset of the plurality of first channels.

20. The method of claim 19, wherein the method further comprises:
connecting an elongated third mounting portion of a third linear light fixture with a tertiary channel of the plurality of first channels;
connecting the elongated third mounting portion with a tertiary channel of the plurality of second channels; and
defining a common three-light spacing between the first linear light fixture and the second linear light fixture and between the second linear light fixture and the third linear light fixture, in part, by selecting the first channel from the second subset of channels, the another channel from the fourth subset of channels, and the tertiary channel from the second subset of the plurality of first channels.

* * * * *